US012186777B2

(12) United States Patent
Johnstone

(10) Patent No.: US 12,186,777 B2
(45) Date of Patent: Jan. 7, 2025

(54) SCREENING PANEL

(71) Applicant: Schenck Process Australia Pty Limited, North Ryde (AU)

(72) Inventor: Aidan Paul Johnstone, North Ryde (AU)

(73) Assignee: Schenck Process Australia Pty Limited, North Ryde (AU)

( * ) Notice: Subject to any disclaimer, the term of this patent is extended or adjusted under 35 U.S.C. 154(b) by 0 days.

(21) Appl. No.: 18/010,552

(22) PCT Filed: Jun. 16, 2021

(86) PCT No.: PCT/AU2021/050623
§ 371 (c)(1),
(2) Date: Dec. 15, 2022

(87) PCT Pub. No.: WO2021/253084
PCT Pub. Date: Dec. 23, 2021

(65) Prior Publication Data

US 2023/0234100 A1 Jul. 27, 2023

(30) Foreign Application Priority Data

Jun. 17, 2020 (AU) ................................ 2020902012

(51) Int. Cl.
*B07B 1/46* (2006.01)

(52) U.S. Cl.
CPC ........ *B07B 1/4645* (2013.01); *B07B 2201/02* (2013.01)

(58) Field of Classification Search
CPC ...... B07B 1/4645; B07B 2201/02; B07B 1/46
(Continued)

(56) References Cited

U.S. PATENT DOCUMENTS 4,265,742 A 5/1981 Bucker et al.
4,661,245 A * 4/1987 Rutherford ........... B07B 1/4645 209/412
(Continued)

FOREIGN PATENT DOCUMENTS

WO 2006/031176 A1 3/2006
WO 2015/106305 A1 7/2015

OTHER PUBLICATIONS

International Search Report for PCT/AU2021/050623 mailed on Sep. 20, 2021.

*Primary Examiner* — Michael McCullough
*Assistant Examiner* — Jessica L Burkman
(74) *Attorney, Agent, or Firm* — Dennemeyer & Associates LLC

(57) ABSTRACT

The invention relates to screening panels such as a mineral screening panel, and related screening systems. In one aspect, the invention provides a panel suitable for engaging a supporting frame in abutment with a number of adjacent screening panels including: a screening surface with peripheral sides and screening apertures between the peripheral sides; each peripheral side having a plurality of engaging protrusions extending from the peripheral side in a direction transverse to the screening surface for engaging the supporting frame to secure the screening panel to the supporting frame; wherein the protrusions are shaped and sized to engage complementary formations on the supporting frame in a snap-fit configuration. The invention also relates to a screening system including a plurality of screening panels and a supporting frame.

18 Claims, 14 Drawing Sheets

(58) Field of Classification Search
USPC .......................................................... 209/363
See application file for complete search history.

(56) References Cited

U.S. PATENT DOCUMENTS

| | | | |
|---|---|---|---|
| 4,762,610 | A | 8/1988 | Freissle |
| 4,892,767 | A | 1/1990 | Freissle |
| 10,981,198 | B2 * | 4/2021 | Persson ............... F16B 23/0061 |
| 2017/0209901 | A1 * | 7/2017 | Quinn ................... B07B 1/4645 |

* cited by examiner

SCREENING PANEL

CROSS-REFERENCE TO RELATED APPLICATIONS

This is a 35 U.S.C. 371 National Stage Patent Application of International Application No. PCT/AU2021/050623, filed Jun. 16, 2021, which claims priority to Australian application 2020902012, filed Jun. 17, 2020, each of which is hereby incorporated by reference in its entirety.

FIELD OF THE INVENTION

This invention relates to a screening panel and more specifically, but not exclusively, to a mineral screening panel and related screening system.

BACKGROUND TO THE INVENTION

Mineral screening is widely used, especially in the mining industry, to separate crushed ore into grades with a consistent and specific particle size. In other industries, screening may, for example, be used for separation of trash, dewatering, draining and rinsing, and/or degritting. Historically, screening systems made use of screens of woven wire. As the screens would wear and damage, screens would have to be replaced regularly. More recently, modular screening systems with replaceable panels (typically made of rubber or polyurethane over a steel frame) were introduced which allowed users to replace worn panels. These modular systems are desirable as wear on the surface of a screening bed is not uniform and the modularity of these systems allow only worn panels to be replaced as and when needed.

Screening is an integral part of many mining operations and screens and panels are regarded as wear items. As such, they contribute directly to the profitability of a mine and any improvement which addresses the disadvantages of current systems is highly desirable. Some of the disadvantages associated with current modular screening systems include the downtime which is associated with, and specialised tooling used for, replacement of worn panels, the cost of replacement panels, the loss of open area in the panels to allow for reinforcing, the weight of the panels (which add to running costs of the system in general), and ingress of fine ore between the panels.

Many ways of addressing these disadvantages are described in the prior art. Australian patent number 2006243879, in the name of Ludowici Australia Pty Ltd, entitled "A screening module retaining assembly" ("the Ludowici disclosure") discloses a screening module retaining assembly which includes a body member defining a passage. The body member includes a locating formation, associated with a first end of the body member, for engaging a screening module to assist in retaining the screening module relative to a screen deck. A retaining element is displaceably arranged in the passage, the retaining element being displaceable between a first, non-retaining position in which the retaining element is accessible from the first end of the body member and a second, retaining position in which the retaining element is received within the passage and acts on at least a part of the body member for retaining the body member in position relative to a component of the screen deck. A head portion of the retaining element defines a receiving formation for receiving a complementary formation of the screening module to assist in laterally retaining the screening module relative to the screen deck. A disadvantage of the retaining assembly described in the Ludowici disclosure is that it requires intermediate retaining elements and frames to attach screening modules to the screen deck. This increases the quantity of parts required for use and installation which is undesirable.

Patent Cooperation Treaty international application number PCT/AU2015/000009 (published as WO 2015/106305), in the name of Schenck Process Australia Pty Ltd, entitled "Ore screening panel fixing system" (the earlier Schenck disclosure") discloses a screening deck which includes a plurality of screening panels to form the screening surface; each panel having a thickness and edge faces on the periphery of the panels. It includes a support frame for the screening panels and fixing means to secure the panels to the support frame. The fixing means consists of recesses in the edge faces and a fixing strip having complementary protrusions to mesh with said recesses on the edge faces, the fixing strip being integral with or securable to the support frame. A disadvantage of the system described in the earlier Schenck disclosure is that edge faces without recesses are not secured to the fixing strip which allows movement between adjacent edge faces and ingress of fines between the edge faces.

U.S. Pat. No. 4,661,245, in the name of Fioris Pty Ltd, entitled "Screening system" ("the Fioris disclosure") discloses a modular screening system which includes a plurality of screening modules supported in an interlocking manner of clamping bars secured to and positioned across a screening machine in parallel spaced relationship. The modules have a peripheral portion defined by side and end walls with a plurality of openings extending through the modules inwardly of the peripheral portion. The side and end walls of the modules are provided with interengaging means which interlock with longitudinal and transverse channels in the clamping bars to secure the modules in position in the machine, the modules are provided with interengaging means whereby the modules interlock together. A disadvantage of the screening system described in the Fioris disclosure, is that the modules require an integrated frame and at least part of the interengaging means protrudes inward from the peripheral portion which decreases open area of the screening modules.

U.S. Pat. No. 9,327,318, in the name of Tega Industries Limited, entitled "Snap fit screen panel and fixing system" ("the Tega disclosure") discloses a fixing arrangement for a screen panel comprising a screen panel having side edges/side faces on either side. The panel is adapted to be fixed to an adapter bar and said bar is adapted to be mounted on a screen deck frame. This bar extends horizontally over said screen deck frame and between side edge regions of a pair of said screen panels, said adapter bar has at least a female portion in the form of a fixing groove on its top surface such that said groove has an internal profile that exactly matches the outer profile of the bottom part of said screen panel for receiving said bottom part securely and snap fitting therewith and the adapter bar is fixed on a portion of the screen deck frame by suitable fixing means. A disadvantage of the panel described in the Tega disclosure is that the screen panel snap-fits into a groove on an adapter bar which permits movement of the screen panel in the direction of the groove. This causes relative movement between panels and may lead to ingress of fines between the panels.

U.S. Pat. No. 4,762,610, in the name of Screenex Wire Weaving Manufacturers (Proprietary) Limited, entitled "Screening arrangement" ("the Screenex disclosure") discloses a screening panel having screening apertures and which can be secured to a support frame side-by-side with similar panels to form a screen deck. The panel has ridges along two of its sides which project above the screening surface. The ridges form a channel which confines liquid flowing across the screen deck to flow across the screening apertures. Grooves extend through the ridges to direct liquid flowing across the screen deck directly into the screening apertures. The screening panel has spigot-like protrusions spaced from each other along the peripheral region of the panel. The protrusions fit in pairs with the protrusions on similar panels through fixing apertures in a support frame. A disadvantage of the Screenex disclosure is that at least part of the spigot like protrusions extend inwardly from the periphery taking up space which may more usefully have been utilized by screening apertures to increase open area of the panel.

Patent Cooperation Treaty international application number PCT/SE2005/001303, in the name of Metso Minerals (Wear Protection) AB, entitled “Screen and screen element” (“the Metso disclosure”) discloses a screen element of a screen with longitudinal sides adapted to be arranged in a longitudinal direction of a screen frame and transverse sides adapted to be arranged in a transverse direction of the screen frame. The transverse sides of the screen element are provided with at least one projection and/or at least one recess for locking engagement, in a direction transversely to the plane of the screen element, with a corresponding projection and/or recess on neighbouring screen elements arranged in the screen frame. A screen with a screen element is also disclosed which comprises a plurality of screen elements arranged by snap locking on a screen frame via attachment sections. The snap locking consists of an undercut groove which engages the attachment sections in the longitudinal direction of the screen. A disadvantage of the screen element and screen in the Metso disclosure is that the undercut groove used for snap locking provides only frictional resistance to elements sliding along the attachment sections in the longitudinal direction and the frictional resistance might be overcome under higher loading conditions. This would cause undesirable sliding movement along the attachment sections and between elements which can form gaps and ingress of fine ore between elements.

OBJECT OF THE INVENTION

It is accordingly an object of this invention to provide a screening panel which, at least partially, alleviates at least some of the disadvantages associated with the prior art or provides a useful alternative thereto.

SUMMARY OF THE INVENTION

In accordance with the invention there is provided a screening panel suitable for engaging a supporting frame in abutment with a plurality of adjacent screening panels including:

- a screening surface, peripheral sides and screening apertures between the peripheral sides;
- each said peripheral side having a plurality of engaging protrusions extending from the peripheral side in a direction transverse to the screening surface for engaging the supporting frame;
- the engaging protrusions being shaped and sized to engage complementary formations on the supporting frame in a snap-fit configuration for restricting longitudinal movement along each said peripheral side of the panel and movement of the panel transverse to the screening surface when engaged;
- each said peripheral side having inter-panel formations for engaging adjacent said screening panels which, when engaged to an adjacent panel, restrict relative movement between the screening panel and the adjacent screening panel longitudinally along the engaged side and transverse to the screening surface.

The engaging protrusions define voids between adjacent said engaging protrusions arranged in a regular pattern of said engaging protrusions and voids along each said peripheral side.

The screening panel may have a polygonal shape with an even number of sides such that each side has an opposing parallel side.

The opposing sides may have complementary and interlocking inter-panel formations such that the inter-panel formations on one side of the screening panel engage and interlock with the complementary and interlocking formations on an opposing side of an adjacent panel.

The inter-panel formations on one said peripheral side are identical to the inter-panel formations on every other peripheral side such that a said screening panel may engage adjacent said screening panels in multiple orientations.

The peripheral shape may be square.

The peripheral shape of the panel may be rectangular and the length of the rectangular shape is double the width of the rectangular shape.

The inter-panel formations may include an arrangement of the engaging protrusions wherein the engaging protrusions extend and are staggered transversely from the respective peripheral side with a complementary and inversely staggered arrangement on an opposing respective said peripheral side such that the staggered protrusions on the respective said peripheral side of the screening panel interlock with the complementary and inversely staggered said engaging protrusions on an opposing respective said peripheral side of an adjacent screening panel to secure the screening panel to the adjacent screening panel in a direction longitudinally along and between adjoining respective said peripheral sides.

The secondary inter-panel formations may include convex nodules and concave indents on alternating staggered protrusions.

The inter-panel formations may be formed by the peripheral sides which are curved along the peripheral side.

The inter-panel formations may be primary formations and further may include secondary inter-panel formations. The secondary inter-panel formations may be superimposed on the primary formations.

The inter-panel formations may be alternating protrusions and indentations extending transversely from a respective said peripheral side and further may be a said primary inter-panel formation or a said secondary inter-panel formation, and further may inter-engage in a snap-fit configuration.

The panel may be of unitary construction.

The screening panel may include integrally formed structural formations.

The structural formations may be at least one rib with the or each said rib extending from one side to an opposing side between the screening apertures.

One or more ribs may also include engaging protrusions.

The screening panel may be made of injection moulded plastic.

The screening panel may be made of injection moulded polyurethane.

In accordance with a second aspect of the invention there is provided a screening system comprising:

a supporting frame; and a plurality of screening panels;

the supporting frame arranged in a pattern corresponding to the sides of the screening panels such that the supporting frame forms open portions between supporting frame arm sections of the supporting frame, and the, engaging protrusions on the peripheral sides of the screening panels engage complementary formations positioned on the supporting frame arm sections of the supporting frame in a snap-fit configuration.

The system may include a plurality of supporting frame protectors, each said supporting frame protector abutting a said supporting frame arm section for protecting the supporting frame arm section from material screened by the screening surface of a respective said screening panel with said material screened passing through a said open portion of the supporting frame.

The frame protectors are angled to form a tapered chute in the open portion and ends of the frame protectors are mitred to correspond with and abut opposing ends of adjacent protector panels.

Two opposing said frame protectors may be joined back to back by an intermediate portion, wherein a respective first said frame protector protects one side of a said supporting frame arm section and a second said frame protector joined to said first frame protector protects an opposed side of said supporting frame arm section, and the intermediate portion joins the first and the second frame protectors such that the frame protectors straddle said supporting frame arm section.

The frame protector may include a number of integrally formed complementary formations for engaging the engaging protrusions of a screening panel.

The frame protector may include apertures between the complementary formations such that the complementary formations of the supporting frame may extend through the apertures.

The formations may be arranged such that the complementary formations of the frame protector and complementary formations of the supporting frame align when the frame protector is installed.

The frame protector may be shaped and sized to correspond to the shape and size of the open portions and include integrally formed structural member in the open portion.

The system may further include a side panel attached to an outer periphery of the supporting frame, the side panel including a plurality of spaced side panel engaging protrusions extending from one side of the side panel for engaging complementary formations on the supporting frame in a snap-fit configuration, whereby the side panel extends upwardly from the outer periphery of the supporting frame above at least one said screening panel.

The side panels may include inter-panel formations for engaging sides of screening panels on the outer periphery of the frame.

The system may include one or more impact panels suitable for engaging a supporting frame in abutment with a number of adjacent screening panels or impact panels including an impact surface with peripheral sides; each peripheral side having a plurality of engaging protrusions extending from the peripheral side in a direction transverse to the impact surface for engaging the supporting frame to secure the impact panel to the supporting frame; and wherein the protrusions are shaped and sized to engage complementary formations on the supporting frame in a snap-fit configuration.

The sides may include inter-panel formations for engaging and securing the impact panel to adjacent screening panels or impact panels.

The impact panels are identical to the screening panels except that impact panels do not include screening apertures.

In accordance with a third aspect there is provided a screening panel suitable for engaging a supporting frame in abutment with a number of adjacent screening panels including a screening surface, peripheral sides; each said peripheral side having a peripheral side face; each said peripheral side further having a plurality of spaced engaging protrusions extending from a respective said peripheral side face in a direction transverse to the screening surface for engaging the supporting frame; wherein the engaging protrusions are shaped and sized to engage complementary formations on the supporting frame in a snap-fit configuration to constrain and support the screening panel to and on the supporting frame along each said peripheral side.

Preferably each said engaging protrusion has an engaging protrusion surface forming a coplanar extension of said peripheral side face.

The aforesaid screening panel may further include one or more screening apertures located inwardly of said peripheral sides extending from said screening surface through said screening panel to an opposed surface opposite to said screening surface intended to face toward said supporting frame.

A screening deck according to this development may include multiple said screening panels supported on and constrained to a said supporting frame with said screening panels positioned with at least one said peripheral side face abutting a said peripheral side face of an adjacent said screening panel; the rigidity of the engaging protrusions on the screening panels being relatively greater than the rigidity of the complementary formations on the supporting frame such that the complementary formations deform to engage a said engaging protrusion of the screening panels in said snap-fit engagement.

The panel may be made of stainless steel.

The screening surface may be formed by regularly spaced elongated wedges extending across the screening surface with screening apertures between each elongated wedge.

The frame may be made of thermoplastic polyurethane (TPU).

The frame may be made of rubber.

In accordance with a fourth aspect of the invention there is provided a screening panel suitable for engaging a supporting frame including a screening surface with peripheral sides and screening apertures between the peripheral sides; each peripheral side being continuously supported by the supporting frame; the screening panel having on its frame facing surface planar protrusions arranged continuously along the peripheral sides being shaped and sized to engage complementary formations on the supporting frame in a snap-fit configuration creating a simply supported or constrained plate construction for the panel.

The panel is suitable for engaging the supporting frame in abutment with a plurality of adjacent panels wherein each panel and adjacent panel engages complementary formations on the supporting frame in a snap-fit configuration creating a simply supported or constrained plate construction for each panel and adjacent panel.

BRIEF DESCRIPTION OF THE DRAWINGS

An embodiment of the invention is described below, by way of example only, and with reference to the drawings in which.

DETAILED DESCRIPTION OF THE DRAWINGS

Figure 1:
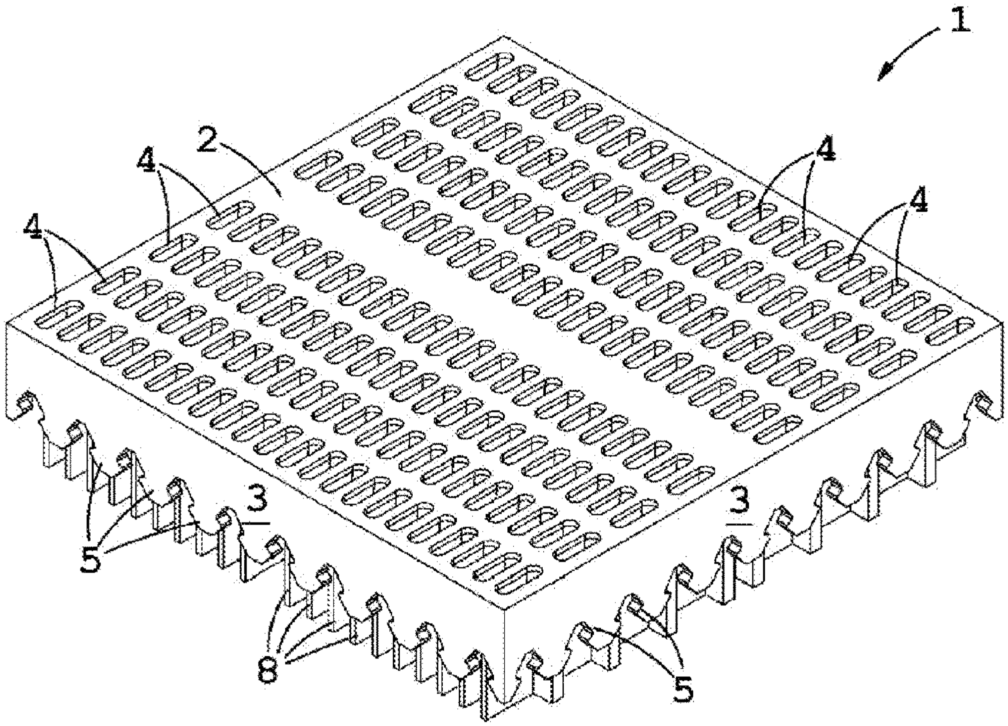
FIG. 1 is a schematic upper perspective view of a first embodiment of a screening panel.
Figure 2:
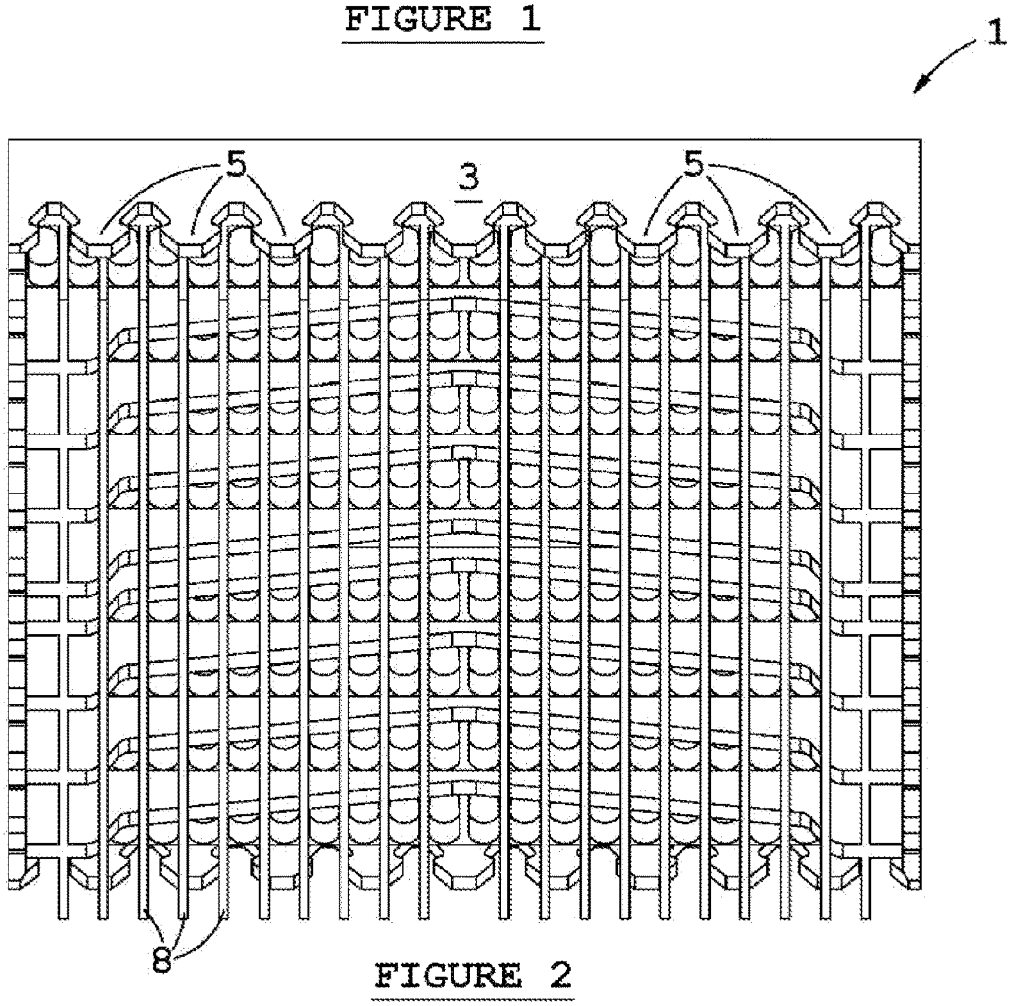
FIG. 2 is a schematic lower perspective view of the screening panel of FIG. 1.

With reference to the drawings in which like features are indicated by like numerals, a screening panel is generally indicated by reference numeral 1. Many of the features of the screening panel 1 are repeated and occur numerous times for each embodiment. At least some of these features are indicated in the drawings with appropriate reference numerals. However, due to the great amount of these features, indicating all occurrences with numerals is highly repetitive is not desirable. Those skilled in the art will easily be able to identify like features from the indicated ones.

Figure 22:
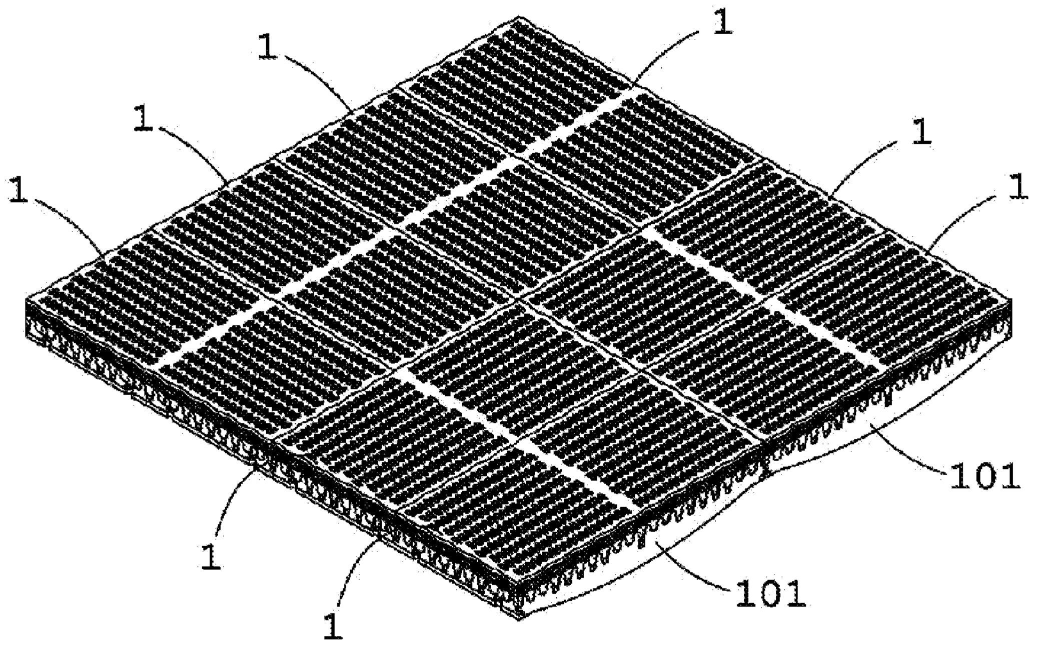
FIG. 22 is a schematic perspective view of a screening system with screening panels of the fourth embodiment of a screening panel.

Five embodiments of the screening panel 1 are shown in the figures. A first embodiment is shown in FIGS. 1 to 5, a second embodiment is shown in FIGS. 6 to 10, and a third embodiment is shown in FIGS. 11 to 15. The first to third embodiments of the screening panel 1 all have a square peripheral profile (as viewed from the top or bottom) with four sides 2. A fourth embodiment is shown in FIGS. 16 to 22. The fourth embodiment is similar to the third embodiment with a rectangular peripheral shape. Two screening panels of a fifth embodiment are shown in FIG. 22 which are similar to the third embodiment but with larger screening apertures 4.

The screening panel 1 is of unitary construction made of a single (or single composite) material and utilises the shape thereof for structural strength and rigidity. This obviates the need for an embedded steel frame to provide structural strength and rigidity and greatly simplifies the manufacturing thereof and makes the panels 1 more cost effective to manufacture. Each screening panel 1 has a screening surface 2 with peripheral sides 3 and a plurality of screening apertures 4 which extend through the screening surface 2 (in a direction which is typically the direction of screening). In the examples described herein, the screening panels 1 all have four sides 3. However, those skilled in the art with reference to the description herein will appreciate that many polygonal peripheral profiles may be utilised to achieve a similar effect whilst maintaining the advantages of the screening panels described herein. The shape and size of the screening apertures 4 may similarly vary according to the application of the screening panel. The size will generally depend on the size of the grade of ore or mineral being screened (see for example the difference in size between the apertures shown in the fifth embodiment versus the other embodiments). Similarly, the shape of the apertures may be varied in order to increase or decrease open area, alter the strength of the screening surface 2, or to achieve other desired effects for a specific application.

Figure 3:
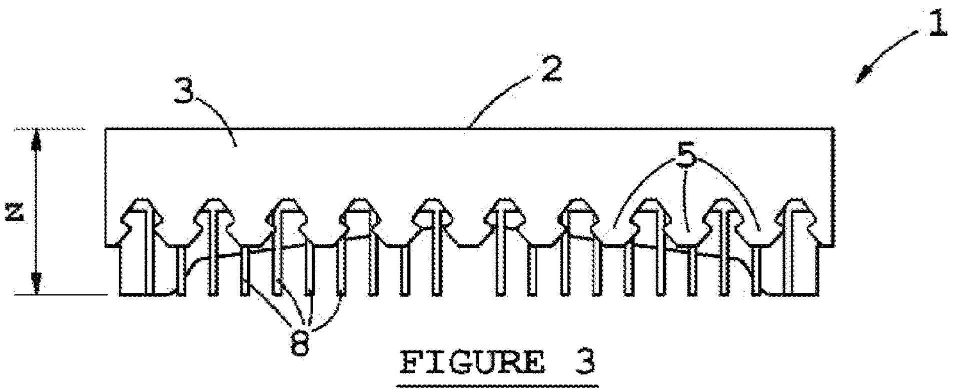
FIG. 3 is a schematic first side view of the screening panel of FIGS. 1 and 2.
Figure 4:
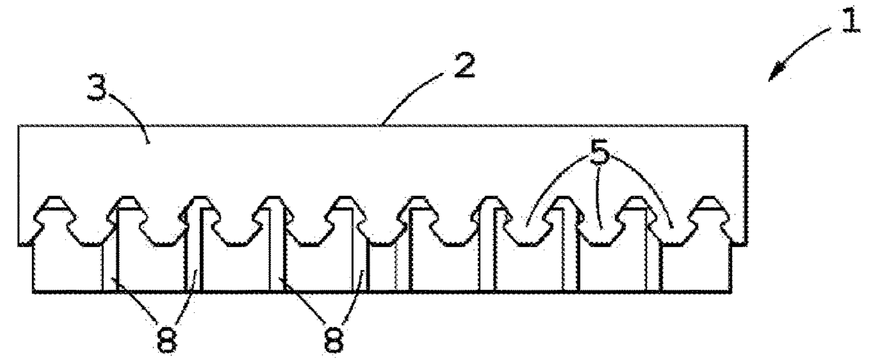
FIG. 4 is a schematic second side view of the screening panel of FIGS. 1 to 4.
Figure 5:
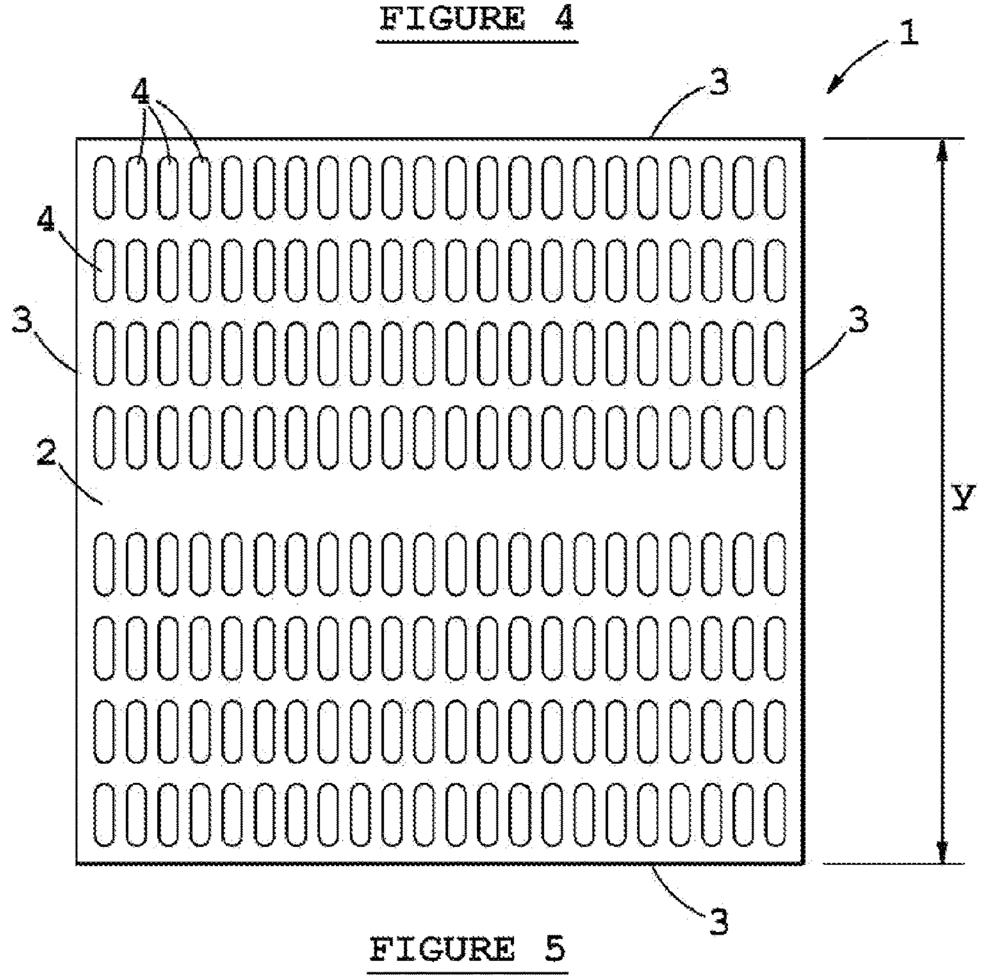
FIG. 5 is a schematic top view of the screening panel of FIGS. 1 to 4.
Figure 6:
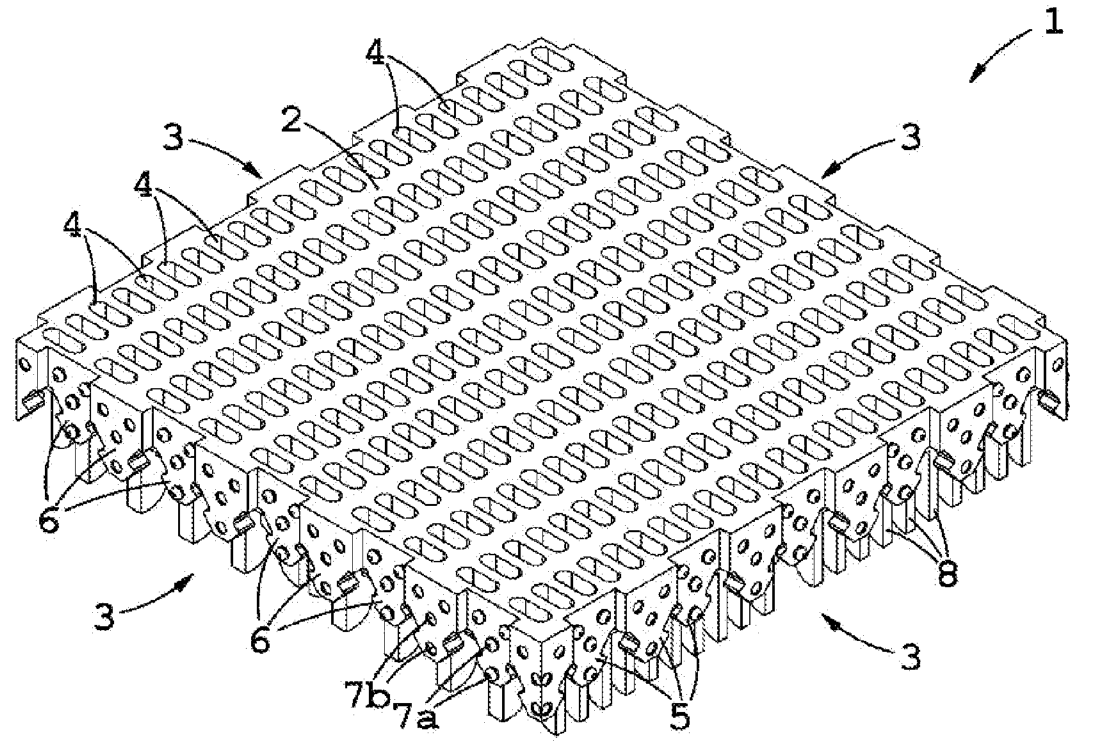
FIG. 6 is a schematic upper perspective view of a second embodiment of a screening panel.
Figure 7:
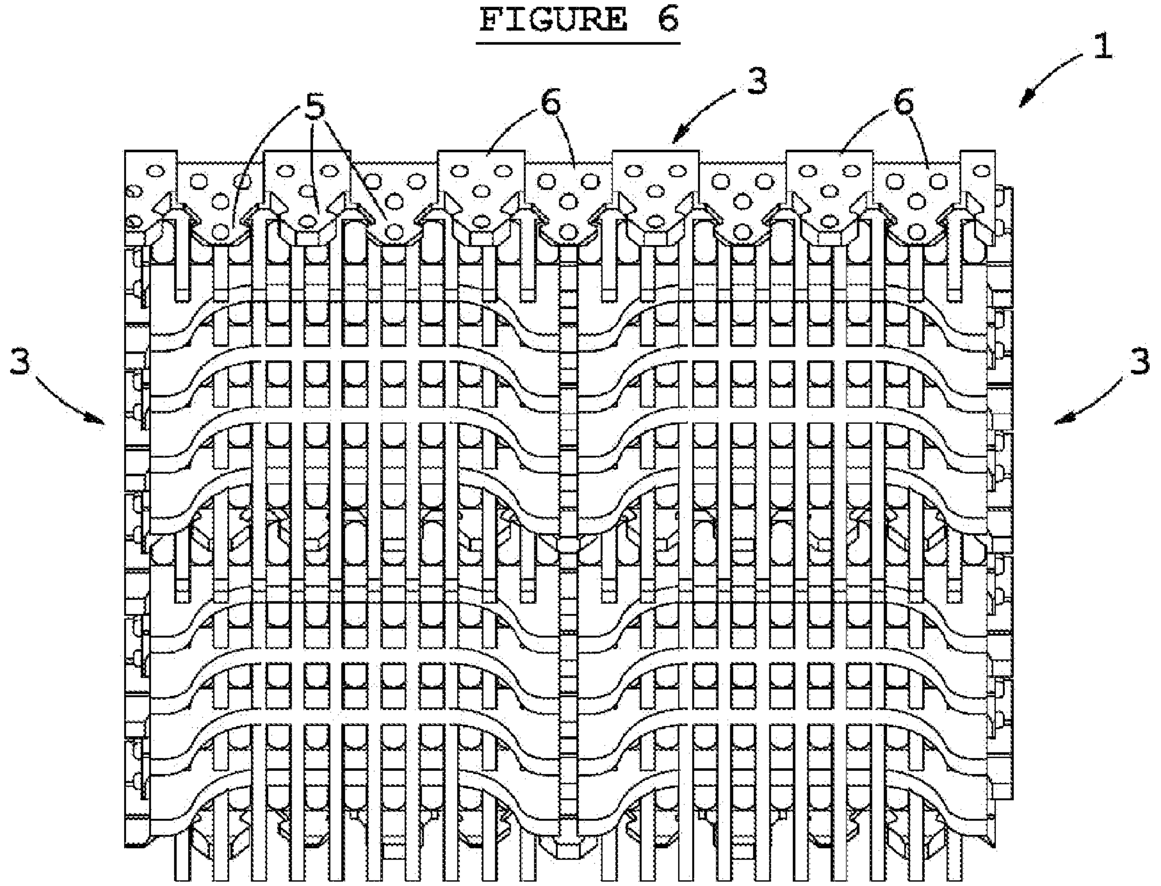
FIG. 7 is a schematic lower perspective view of the screening panel of FIG. 6.
Figure 8:
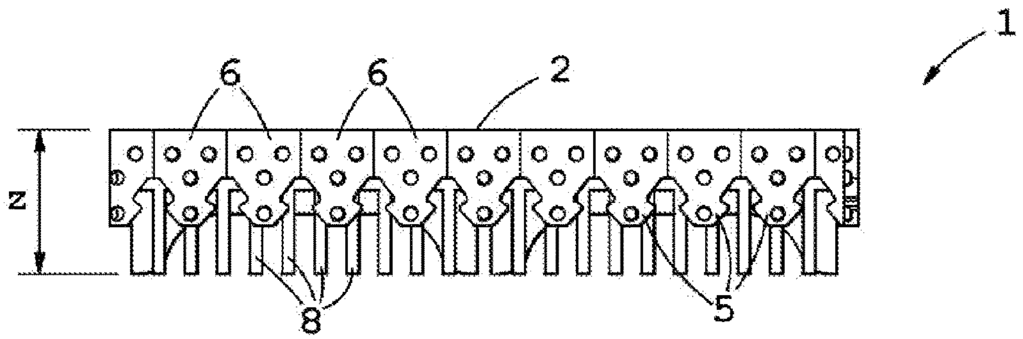
FIG. 8 is a schematic first side view of the screening panel of FIGS. 6 and 7.
Figure 9:
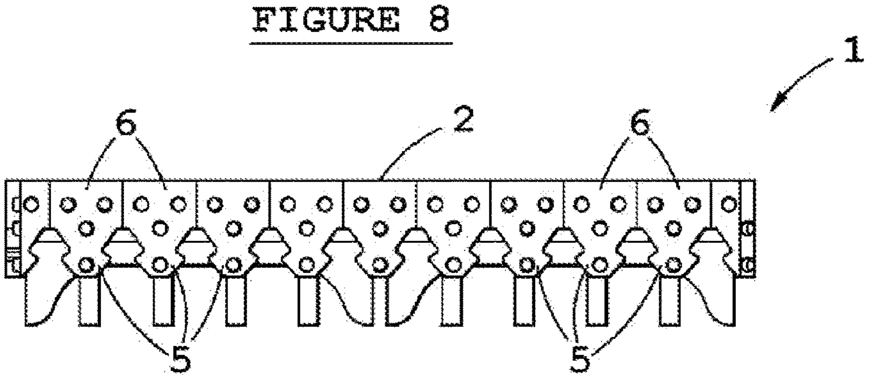
FIG. 9 is a schematic second side view of the screening panel of FIGS. 6 to 8.
Figure 10:
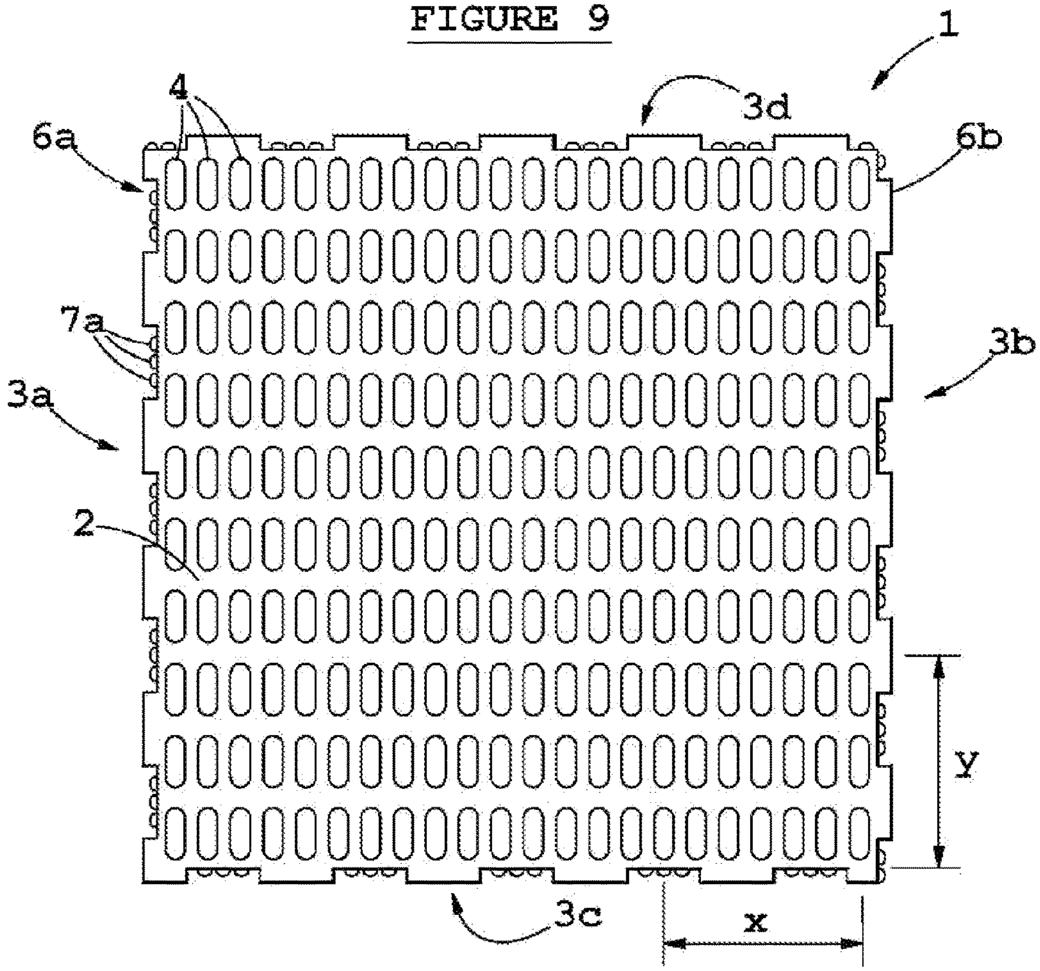
FIG. 10 is a schematic top view of the screening panel of FIGS. 6 to 9.
Figure 11:
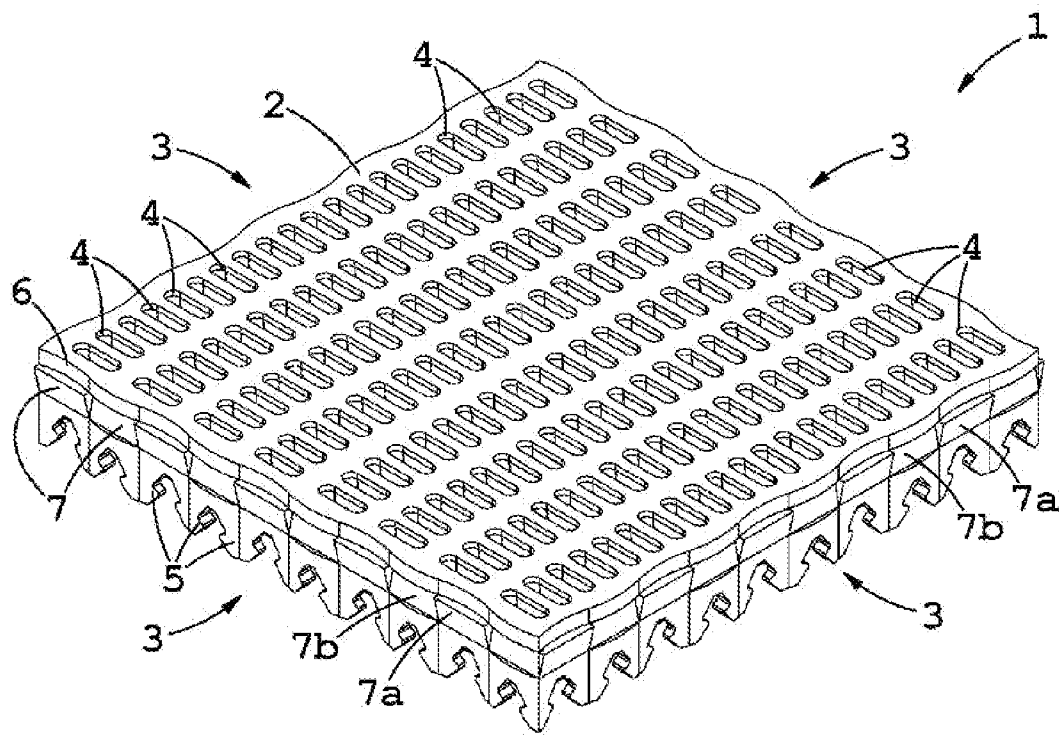
FIG. 11 is a schematic upper perspective view of a third embodiment of a screening panel.
Figure 12:
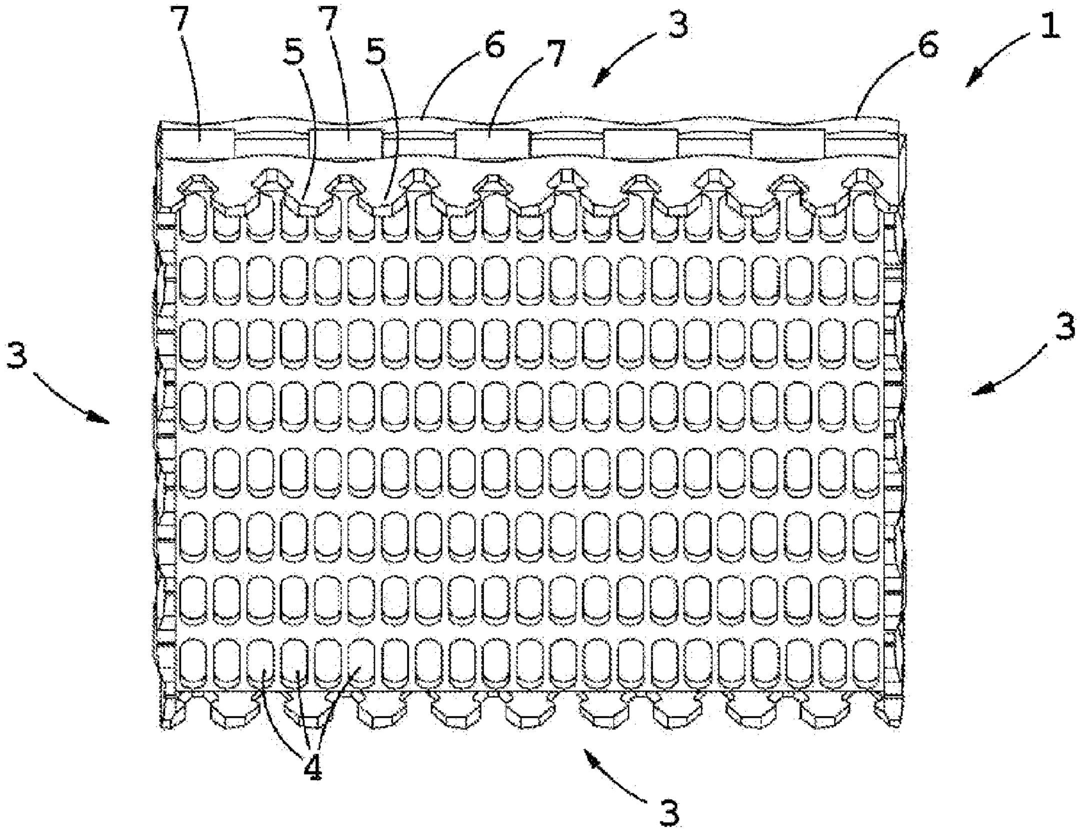
FIG. 12 is a schematic lower perspective view of the screening panel of FIG. 11.
Figure 13:
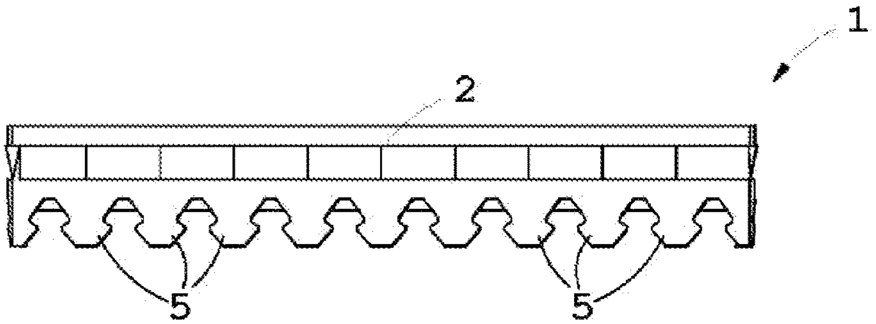
FIG. 13 is a schematic first side view of the screening panel of FIGS. 11 and 12.
Figure 14:
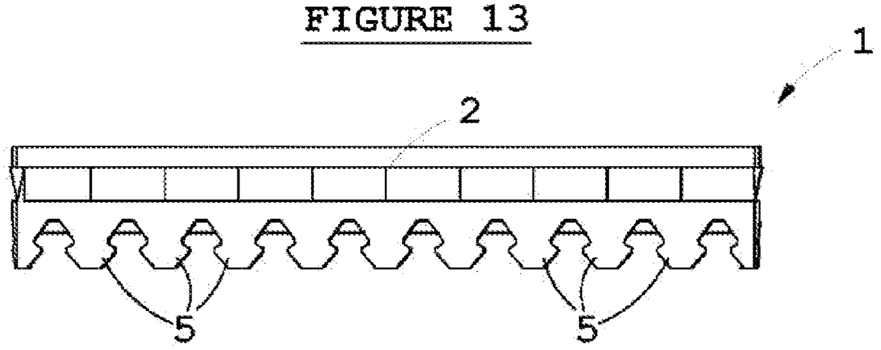
FIG. 14 is a schematic second side view of the screening panel of FIGS. 11 to 13.

The screening panel 1 is used as part of a screening system 100 with the screening panel 1 engaging a supporting frame 101 in abutment with a number of adjacent screening panels 1. Each peripheral side has a plurality of engaging protrusions 5. The protrusions 5 protrude from the sides towards the frame 10 in a direction transverse to the screening surface 2 (in direction z as indicated in FIG. 3). Further, the protrusions 5 are formed in and correspond to the shape of the peripheral sides such that the protrusions are essentially a shaped extension of the peripheral side. This allows the thickness of the protrusions in profile to be the same as the thickness of the peripheral side such that no part of a protrusion 5 will protrude inward to decrease the open area of a panel 1 and that the outermost surface of the protrusions will correspond to the peripheral sides. The protrusions 5 are planar protrusions arranged continuously along the peripheral sides with the outermost planar portion of the planar protrusions corresponding to the sides 3 of the panel and the planar protrusions 5 extending from the panel's frame 101 facing surface. The protrusions 5 are shaped and sized to engage the supporting frame 101 and secure the panel 1 to the frame 101 by engaging complementary formations 102 on the frame 101 in a snap-fit configuration. Snap-fits are generally used to releasably attach flexible components to each other and are widely used in plastic components. In this example, the screening panel 1 will typically be manufactured from rubber or thermoplastic polyurethane (TPU) both of which are highly flexible and resilient. The panels 1 are of a unitary construction and made by air-casting or injection moulded polyurethane. The material, shape, and configuration allow the panels 1 to function without the need for an integrated frame which is present in the prior art. In addition to resisting pull-out force (in direction z) the shape of the protrusions also resist movement along the peripheral sides.

As these protrusions are present on all peripheral sides, movement is simultaneously restricted in both the x and y directions allowing the simple snap fit connection to create an effective attachment to the underlying frame when the panel is installed. The protrusions 5 form a recurring pattern of protrusions and voids which is mirrored in the frame 101. Once engaged, each side 3 of the panel is continuously supported along the side creating a simply supported or constrained plate construction for every single panel 1 which increases the structural integrity and rigidity of each panel when compared to a panel supported only along portions thereof.

The supporting frame 101 will typically be made of a more rigid material such as steel, stainless steel, glass- or carbon fibre reinforced nylon, or ceramic materials. Alternatively, the panels 1 may be made of a stiffer material (such as stainless steel) and the frame made of a resilient material such as polyurethane or rubber whilst retaining the snap fit configuration described above.

The protrusions 5 and the complementary formations 102 described and depicted herein are shaped to interlock and engage in a snap fit. Functionally, each protrusion 5 is similar to two back-to-back multi-use cantilever snap fit formations each capable of engaging and catching an undercut formed by portions of the complementary formations 102. The flexural quality of the snap fit is provided by the compliance and deformation of the protrusions during installation. This allows the panels 1 to easily be installed to the frame by applying force in direction z. This may be done with a hammer or mallet whereby protrusions 5 engage the complementary formations 102 a handful at a time at the position where the force (or hammer blow) is applied. Once all protrusions 5 engage the frame, the combined resistance offered is significant and too great for normal use to dislodge. In order to remove a panel 1, a user will typically use a wedge to remove portions of the panel 1 such that individual snap fits with lower resistance are undone. Having the protrusions 5 on all sides 3 of the panel allows the panels to be easily and quickly installed (using a simple tool as described above) and without the need for additional fasteners or specialized tools. It is desired that the installation process be as simple as possible and it is possible to install the panels 1 by hand without using a hammer as described above. This may be achieved by simply applying pressure to the sides of the panel 1 with a palm or fist. Similarly, removal may be achieved by hand once a corner of a panel is disengaged from the frame. Dislodgement of a corner may be possible by hand but may also be achieved using a screw which is screwed into the corner to provide the necessary leverage (along with a breaker bar or other mechanism) for initial corner dislodgement. Once the first protrusion 5 is dislodged, successive protrusions 5 can be dislodged sequentially by flexibly deforming the panel which requires less force as only the resistance of one protrusion 5 needs to be overcome at a time. This makes the removal of the panel simple and easy without the use of specialised tools and the panel 1 may, once an initial corner has been dislodged, typically be removed by hand.

The second to fifth embodiments of the screening panel 1 have inter-panel formations which engage the panel to adjacent panels. A distinction will be drawn herein between primary inter-panel formations 6 and secondary inter-panel formations 7. The distinction being made as it is possible to distinguish functional features which are common for each. For example, functionally, the primary formations 6 serve to secure adjacent panels 1 in a direction longitudinally along its side (see directions x and y in FIG. 10) whereas the secondary formations 7 serve to secure panels to adjacent panels in a direction transverse to the screening surface 2 (see direction z in FIG. 8) in addition to directions x and y. However, those skilled in the art will recognise that it is not necessary for the formations (6 and 7) to be separate and complex inter-panel formations which secure in multiple directions can be conceived.

It is desirable that where the primary formations 6 and/or the secondary formations 7 alter the shape of sides of the panel, that an opposing side has a complementary and interlocking shape. In order to achieve this, panels need to have an even number of sides such that each side (3*a* or 3*c*) has an opposing parallel side (3*b* or 3*d*). This allows opposing sides to be complementary and interlocking such that the inter-panel formations on one side (3*a* or 3*c*) of the screening panel 1 may engage and interlock with complementary formations (6 and 7) on an opposing side (3*b* or 3*d*) of an adjacent panel 1. Similarly, it is desirable that the formations (6 and 7) on one side are identical to the formations on remaining sides. This allows the panel 1 to be rotated by 90°, 180°, or 270° and engage adjacent panels 1 regardless of the orientation. This is useful, for example, to distribute wear across the panel 1 evenly. It will also be useful, where the apertures 4 of a panel 1 are elongated and material tracks between apertures 4, to install a panel which is rotated by 90° such that the elongated apertures are oriented in a different direction and material which tracks between apertures 4 of a leading panel 1 may be screened by the rotated trailing panel 1.

Typically, as is the case with the embodiments described herein, the peripheral shape of the panels 1 are substantially square. Panels may also be rectangular, as can be seen in the fourth embodiment of the panel shown in FIGS. 16 to 20 and in FIGS. 21 and 22 where the frame is arranged in a square grid and each rectangular panel 1 covers and engages two adjacent square sections of frame. In this embodiment, the formations (6 and 7) on the long side of the panel 1 are identical to two successive repetitions of the formations (6 and 7) of the short side of the panel. This allows the short sides to engage part of the long sides such that two adjacent short sides may engage a long side of the panel. The rectangular panel may also include an additional set of engaging protrusions 5, centrally between the two short sides, to engage the square frame layout.

The examples herein will be described with reference to side 3*a* and opposing side 3*b* with the other sides being similar enough for those skilled in the art to interpret.

In the second embodiment, the primary formations 6 are an arrangement of the protrusions 5 which extend and are staggered transversely from the side 3*a* with a complementary and inversely staggered arrangement on an opposing side 3*b*. The staggered protrusions (see formation 6*a*) on the side 3*a* of the screening panel 1 interlock with the complementary and inversely staggered protrusions (see formation 6*b*) on an opposing side 3*b* of an adjacent screening panel to secure the screening panel 1 to the adjacent screening panel in a direction longitudinally along and between adjoining sides (x or y). The secondary inter-panel formations of the second embodiment of the screening panel 1 are in the form of convex nodules 7*a* and concave indents 7*b* on alternating staggered protrusions 5 which interlock.

Figure 15:
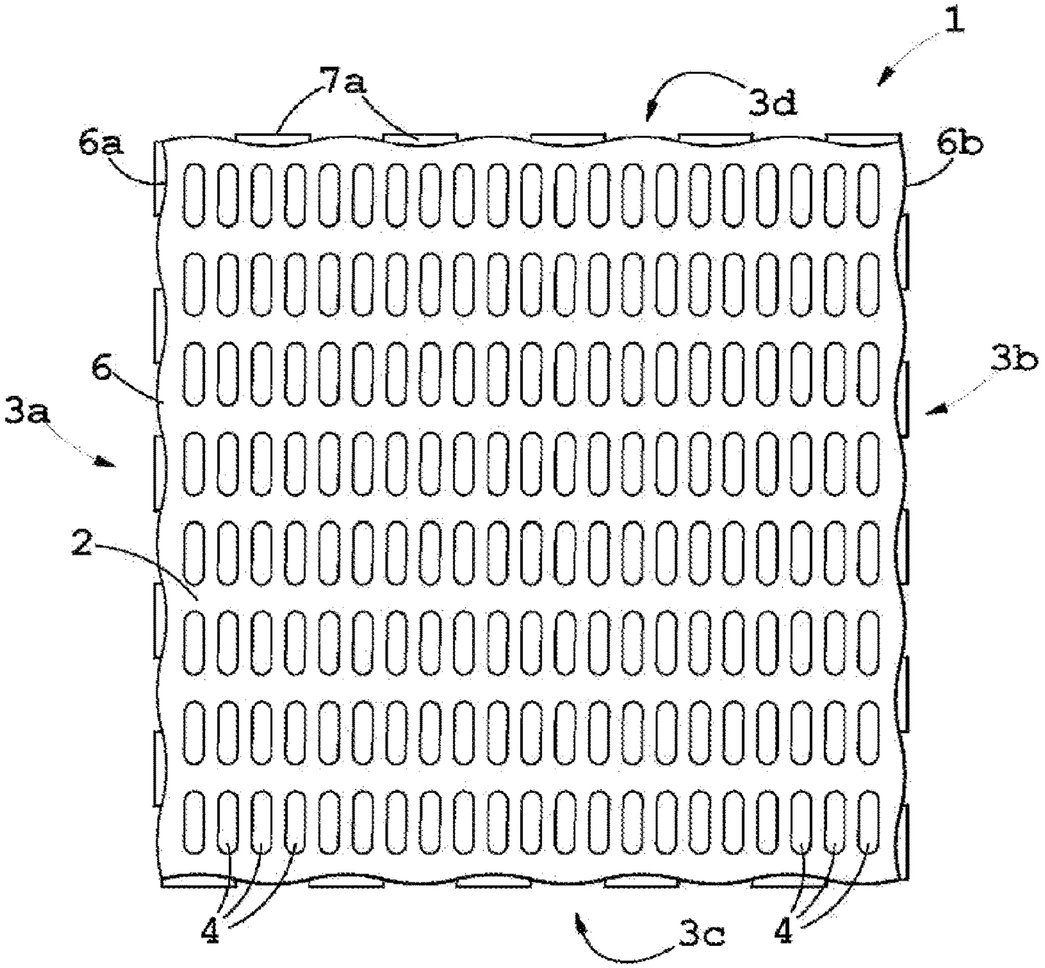
FIG. 15 is a schematic top view of the screening panel of FIGS. 11 to 14.
Figure 16:
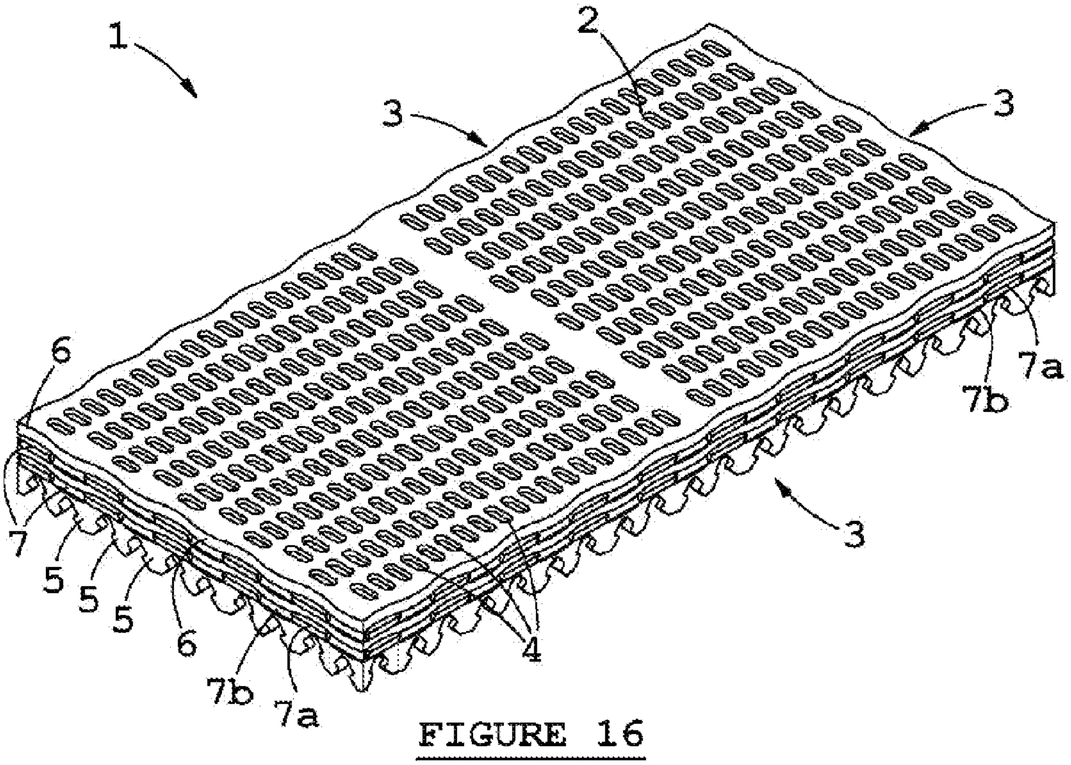
FIG. 16 is a schematic upper perspective view of a fourth embodiment of a screening panel.
Figure 17:
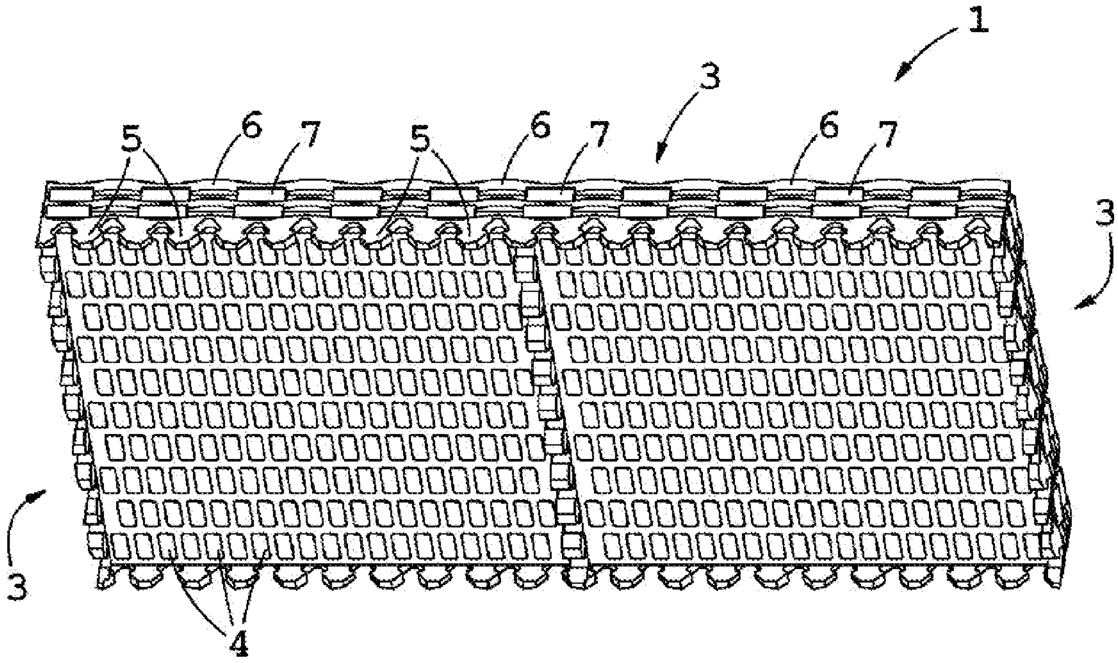
FIG. 17 is a schematic lower perspective view of the screening panel of FIG. 16.
Figure 18:
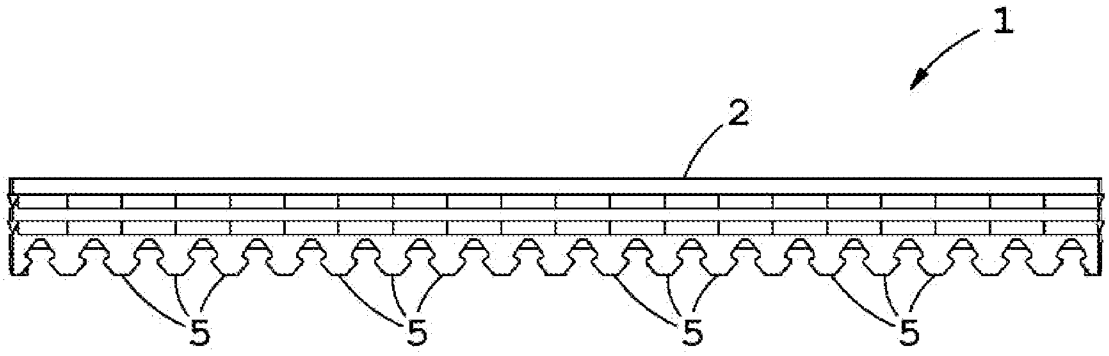
FIG. 18 is a schematic first side view of the screening panel of FIGS. 16 and 17.
Figure 19:
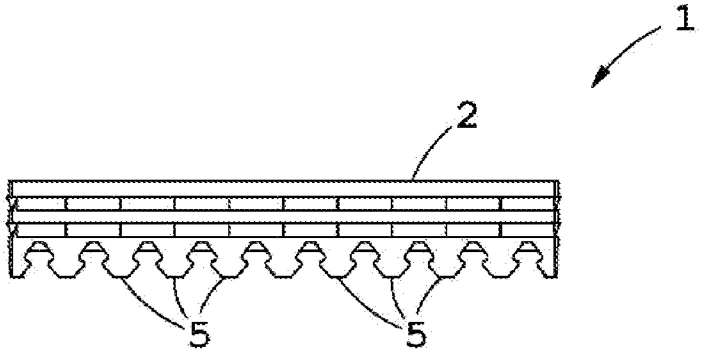
FIG. 19 is a schematic second side view of the screening panel of FIGS. 16 to 18.
Figure 20:
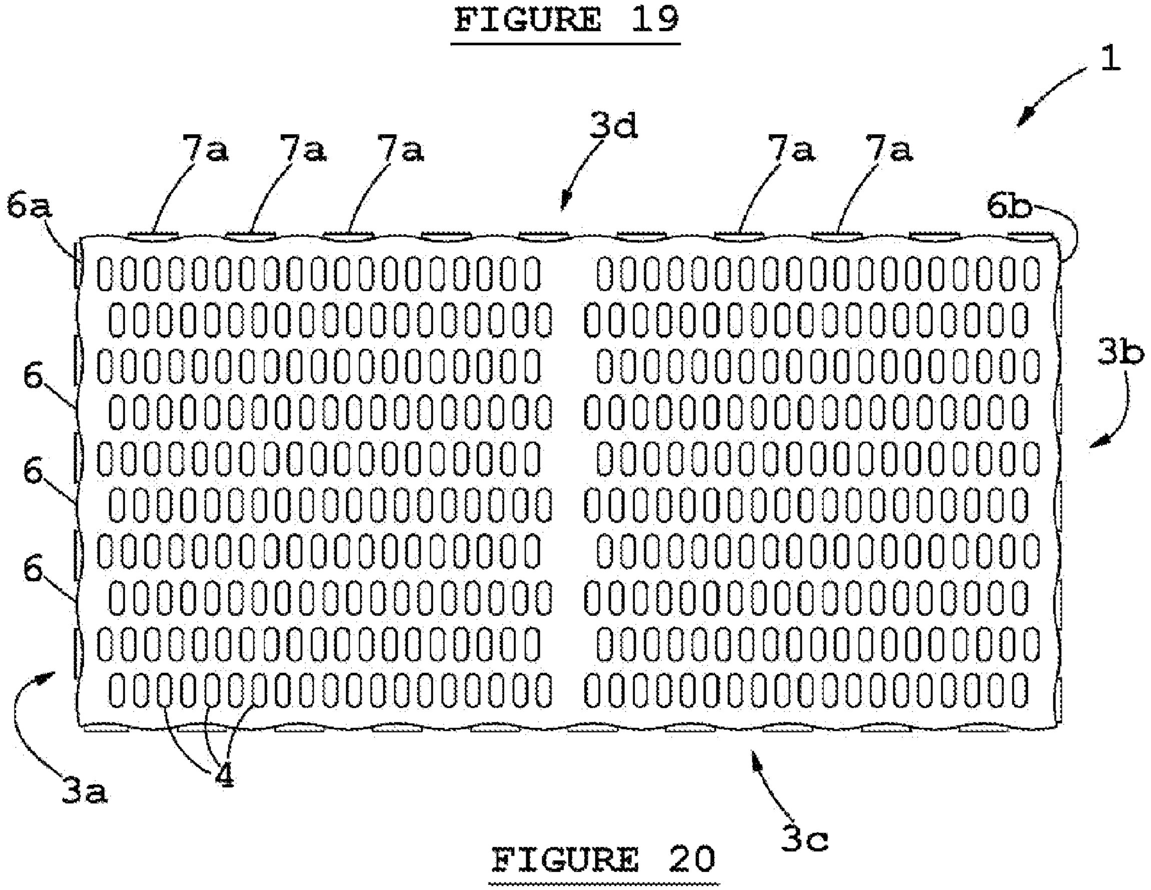
FIG. 20 is a schematic top view of the screening panel of FIGS. 16 to 19.
Figure 21:
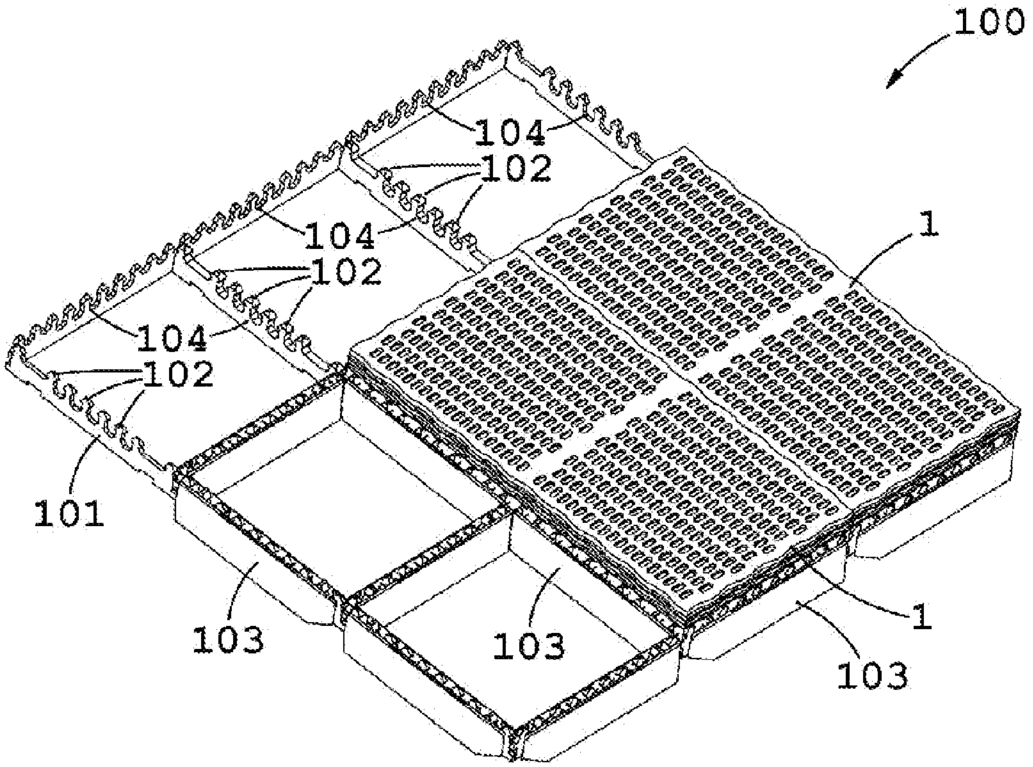
FIG. 21 is a schematic perspective view of a screening system including a number of protector panels and two screening panels of the fourth embodiment of a screening panel.

In the third embodiment, the primary inter-panel formations 6 are in the form of sides 3 which have a curved shape. This curve in the example is a regular and repeating curve (similar to a shallow sinusoidal curve) and runs along the length of each side 3. The curve is best seen in FIG. 15 and is arranged such that each side 3 has five oscillations. The curve on one side 3*a* is inverse to the curve on the opposing side 3*b* such that a concave portion of the curve 6*a* will correspond to a convex portion of the curve 6*b* on the opposing side 3*b*. The third embodiment has secondary inter-panel formations in the form of alternating protrusions 7*a* and indentations 7*b* extending transversely from the side 3 and engage in a snap-fit configuration such that the protrusion 7*a* will engage an indentation 7*b* on an adjacent panel.

The fourth embodiment has curved primary inter-panel formations 6 similar to the third embodiment. The fourth embodiment also has secondary inter-panel formations 7 similar to the third embodiment in the form of alternating protrusions 7*a* and indentations 7*b* and includes two sets of the primary formations 6 and secondary formations 7 which are identical and arranged in a stacked manner. The fourth embodiment has a rectangular peripheral shape which, when the length of the rectangle is divided in half, would form two substantially square portions. The formations (6 and 7) are also arranged such that the formations (6 and 7) on the longer side are two repetitions of the formations (6 and 7) on the shorter side. This allows the longer side to engage to shorter sides along its length so panels may be placed in different orientations. This is clearly shown in FIG. 22 where some of the panels are arranged in one orientation and others are oriented at 90° thereto. Arranging the panels with alternate orientations has advantages for capturing material which might track between apertures 4 if all panels 1 are oriented in the same direction. This allows the fourth embodiment to be used in a system 100 along with square panels 1 where the underlying frame 101 is arranged in a square grid. This also allows the fourth embodiment to include an additional set of engaging protrusions 5 located centrally between the two short sides. The additional set of engaging protrusions 5 may be double the thickness of the engaging protrusions 5 of the short sides to engage the underlying frame where two adjacent square panels would engage the underlying frame.

The screening panel 1 may include integrally formed structural formations 8. The first and second embodiments have structural formations in the form of ribs 8 which extend between the sides 3 and between the screening apertures 4. Where these ribs 8 are located centrally, they may also include engaging protrusions 5 which can engage a supporting frame 101. The ribs shown in the drawings extend in both directions (x and y) and are integrally formed with the panel to provide structural strength.

The invention also extends to a screening panel (not shown) suitable for engaging a supporting frame in abutment with a number of adjacent screening panels including a screening surface with peripheral sides; each peripheral side having a plurality of engaging protrusions extending from the peripheral side in a direction transverse to the screening surface for engaging the supporting frame to secure the screening panel to the supporting frame; wherein the protrusions are shaped and sized to engage complementary formations on the supporting frame in a snap-fit configuration and the rigidity of the panel and engaging protrusions is relatively greater than the rigidity of the supporting frame such that the complementary formations of the frame deforms to engage the engaging protrusions of the screening panel in a snap-fit configuration.

In this form the panel will typically not include inter-panel formations and the rigidity of the panel is greater than that of the underlying frame. This will be useful where a harder wearing material is needed for the screening surface whilst retaining the benefits of the snap-fit as described herein. The snap fit configuration is achieved through flexure of the complementary formations of the underlying frame which is made of a material which is less rigid and more flexible than the panel. Typically, the panel will be made of stainless steel with a screening surface which is formed by regularly spaced elongated wedges extending across the screening surface with elongated screening slots formed between each elongated wedge. The underlying frame will typically be made of thermoplastic polyurethane (TPU) or rubber. In use, multiple panels 1 are used as part of a screening system 100 which may be installed in a vibrating screen. Those skilled in the art will recognise that the panels may also be adapted to be used in trommels. The frame 101 is arranged in a pattern corresponding to the sides 3 of the screening panels 1 such that the frame forms open portions between the frame which is covered by panels 1. The system may include a plurality of frame protectors 103 which abut an internal periphery of the frame 101 from material screened by the screening surface 2 of the panel 1 (such as falling ore) from colliding with and damaging the frame 101. The frame protectors will typical be made of polyurethane or a similar sacrificial polymeric material. The frame protectors 103 may also be made of a stiffer material to stabilise the engaging protrusions and prevent panel 1 dislodgement. The frame protectors 103 may also be attached to a panel 1 prior to installation as described further below. The frame protectors 103 have an angled main surface 105 to form a tapered chute in the open portion and ends 106 of the frame protectors are mitred to correspond with and abut opposing ends 106 of adjacent protector panels. This allows the protectors 103 to be arranged along the internal periphery of the frame 101. The frame protectors shown in FIGS. 21 to 26 consist of two opposing parts which are joined back-to-back by an intermediate portion 107. The first part of the protector 102 protects one side of the frame 103 and the second part of the frame protector 103 protects an opposing side of the frame 101. The intermediate portion 107 joins the part such that the parts straddle the frame 101.

Figure 27:
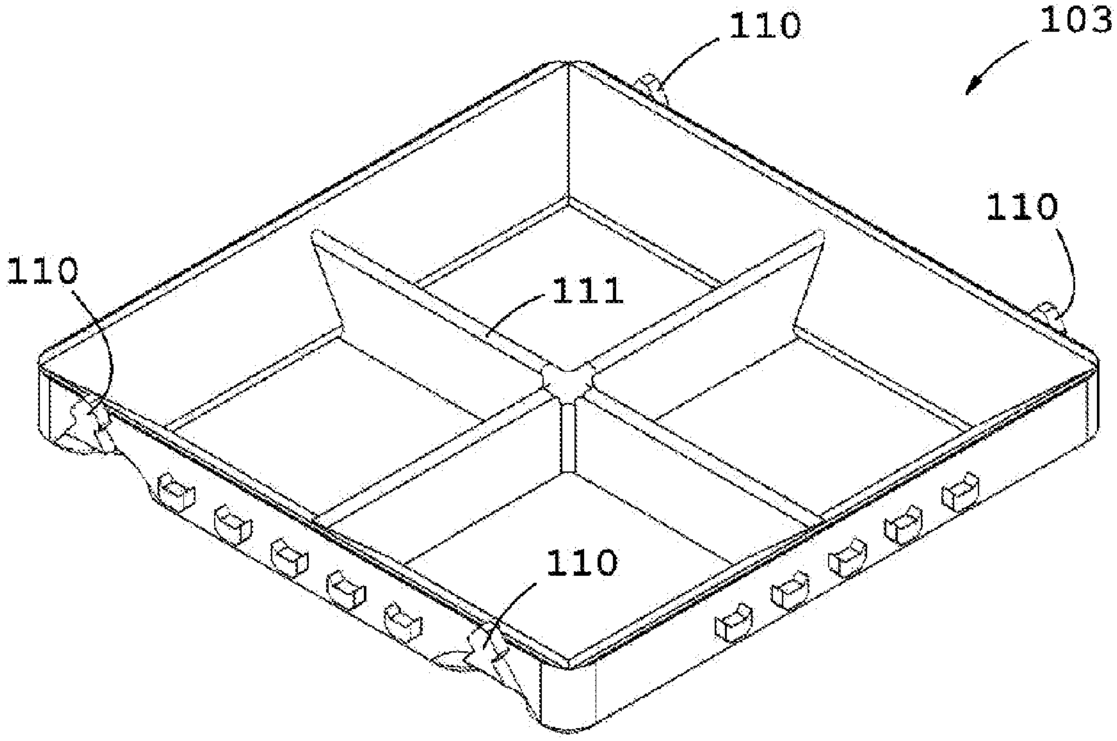
FIG. 27 is a schematic perspective view of a second embodiment of a frame protector.
Figure 28:
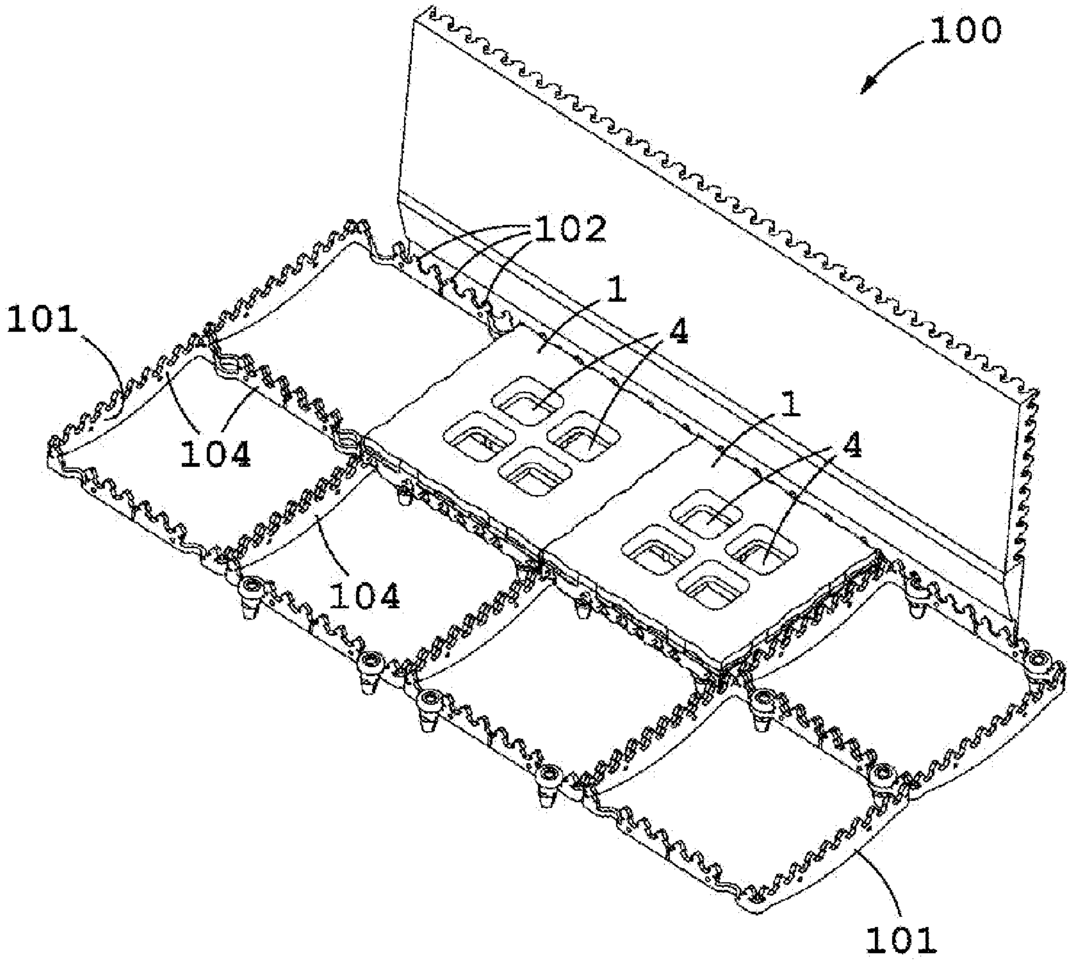
FIG. 28 is a schematic perspective view of a screening system including a side panel and a fifth embodiment of a screening panel.
Figure 29:
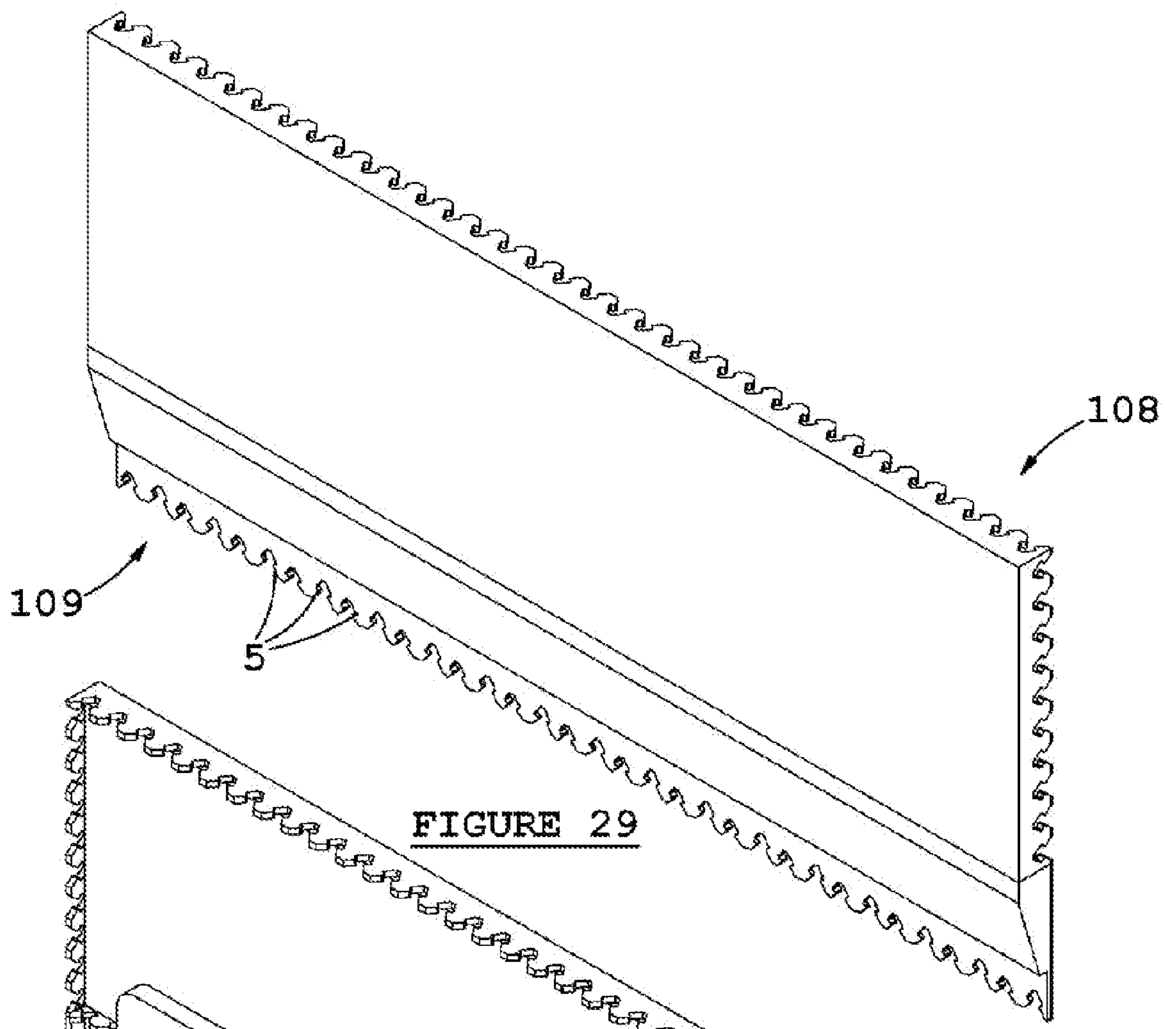
FIG. 29 is a schematic front perspective view of a side panel.
Figure 30:
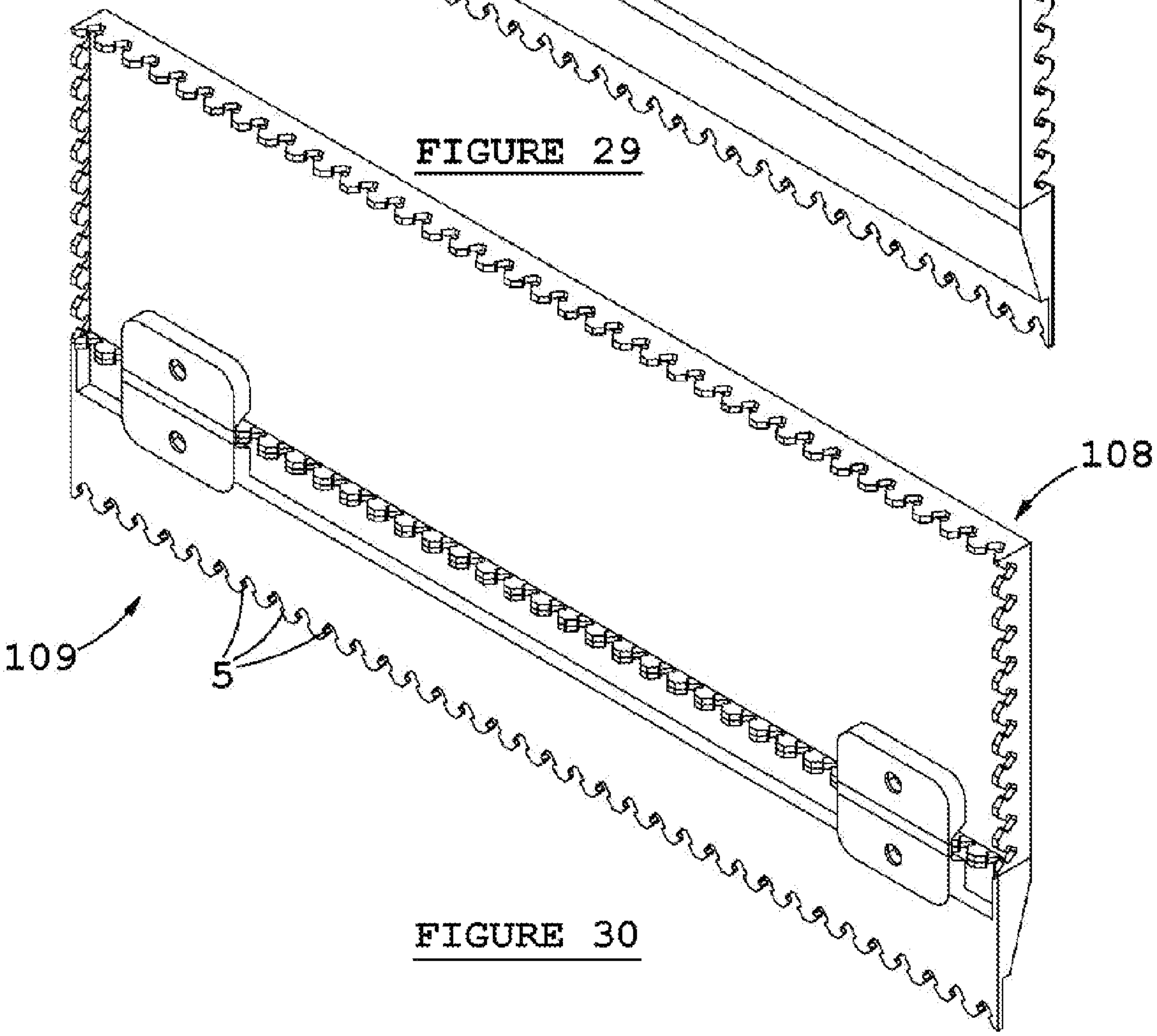
FIG. 30 is a schematic rear perspective view of the side panel of FIG. 29.

An alternative embodiment of a frame protector 103 is shown in FIG. 27. In this embodiment the frame protector 103 is shaped and sized to correspond to the open portion of the frame 101 and includes structural member 111 to structurally strengthen the frame protector 103 and an attached panel 1 (as described below). The frame protector 103 includes a number of integrally formed complementary formations 110 for engaging the engaging protrusions 5 of a screening panel. This allows the frame protector to be preinstalled to a screening panel 1 such that, in use, the screen protector 103 and panel 1 may be replaced on a vibrating screen or trommel simultaneously. This is beneficial as the wear life of a panel 1 and a frame protector are substantially the same. The example shown herein includes four complementary formations 110 at each corner thereof. Between the formations 110 are apertures or openings which allow the engaging protrusions 5 of a panel 1 to engage the underlying frame 101. In addition, the formations 110 of the frame protector 103 will align to the formations 102 of the frame 101 allowing the panel 1 to engage the frame 101 when preinstalled to a protector.

Figure 23:
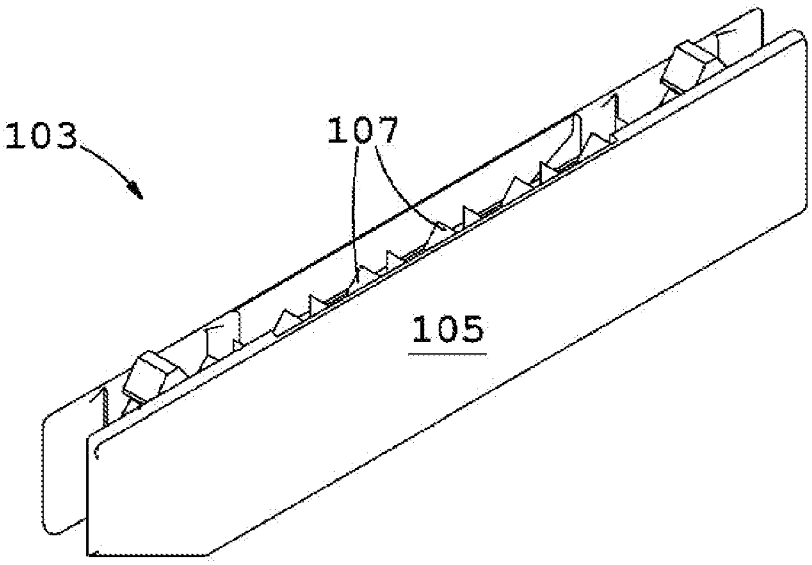
FIG. 23 is a schematic perspective view of a frame protector.
Figure 24:
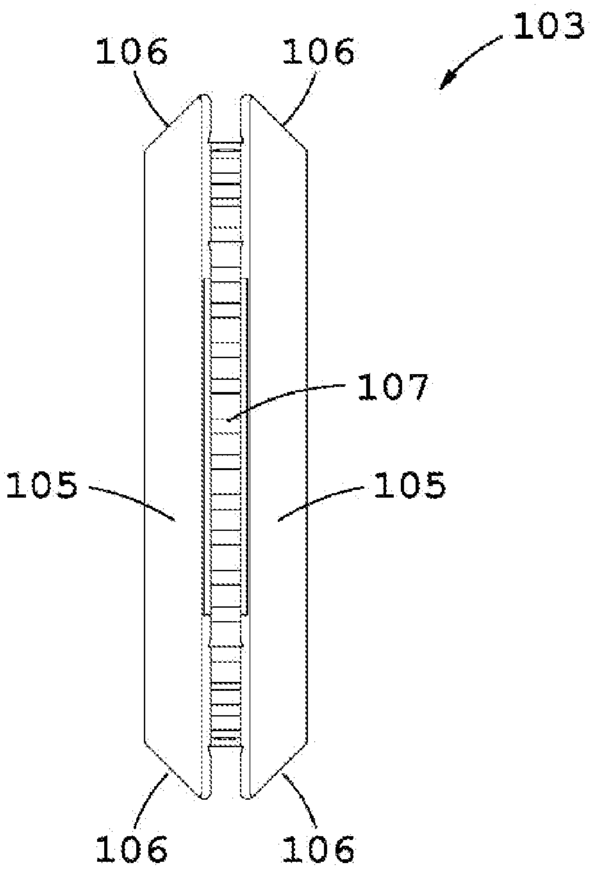
FIG. 24 is a schematic top view of the frame protector of FIG. 23.
Figure 25:
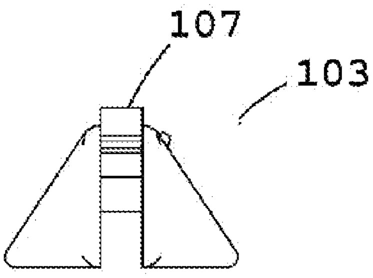
FIG. 25 is a schematic end view of the frame protector of FIGS. 23 and 24.
Figure 26:
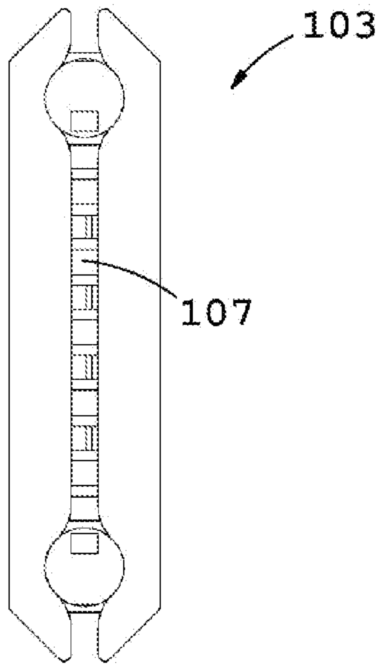
FIG. 26 is a schematic bottom view of the frame protector of FIGS. 23 to 25.

The system 100 also includes a number of side panels 108 which are attached to the outer periphery of the frame and includes a plurality of engaging protrusions 5 extending from one side 109 for engaging complementary formations 102 on the supporting frame 101 in a snap-fit configuration. Further, the side 109 of the side panel 108 may also include inter-panel formations similar to the formations of the panels 1 in order to engage panels 1 installed adjacent to the side panel 108. The side panels 108 may be installed on the sides of a vibrating screen to prevent screened material from damaging the vibrating screen. The side panel 108 shown in FIGS. 22 to 24 is composed of two parts but may be of unitary construction.

The system 100 may include one or more impact panels (not shown). Impact panels are used, for example, where falling ore impacts a vibrating screen. These impact panels are identical to the panels 1 described above except they do not include any screening apertures 4. This allows the initial impact of falling ore to be absorbed before the screening process continues on a vibrating screen. As these impact panels are, save for a lack of screening apertures 4, identical to the screening panels, each impact panel is suitable for engaging a supporting frame 101 in abutment with a number of adjacent screening panels 1 or impact panels including an impact surface with peripheral sides. Each peripheral side has a plurality of engaging protrusions extending from the peripheral side in a direction transverse to the impact surface for engaging the supporting frame 101 to secure the impact panel to the supporting frame 101 and the protrusions are shaped and sized to engage complementary formations on the supporting frame 101 in a snap-fit configuration. The sides of an impact panel may also include inter-panel formations for engaging and securing the impact panel to adjacent screening panels or impact panels.

The panel 1 and system 100 described herein have a number of advantages over the prior art. The presence of protrusions 5 and complementary formations 102 on all peripheral sides allow panels to be secured and resist movement in all principal directions and provides robust attachment to the supporting frame 101 without sacrificing ease of installation and/or removal or compromising the open area of the panel 1. The resistance to movement decreases the possibility for ingress of fines between panels or accidental dislodgement thereof. The unitary and single material construction of each panel allows for simplified manufacturing processes which decreases cost. The inter-panel formations provide resistance to relative movement between the panels in multiple directions and increases the robustness of the system as a whole. The interlocking, symmetric, and complementary nature of the panels 1 and its inter-panel formations are an elegant and effective way of obtaining these advantages. The addition of many of the same features to blank panels, frame protectors, and side panels provide a system which is modular and extends many of the advantages of the panels to other parts which may be used with the system.

It is envisaged that the invention will provide a screening panel which is easily installed or replaced on a screening system using conventional tools. The engaging protrusions of the panel enables users to have panels which are secure in normal use with screening apertures which increase the open area when compared to conventional screening panels which use external fasteners or have an integrated frame. The inter-panel formations further enhance the integrity and engagement of the panels and the system allowing reduced material cost whilst maintaining the advantages of the greater open area.

The invention is not limited to the precise details as described herein. For example, instead of having square panels, hexagonal or octagonal panels may be used. Further, instead of having primary and secondary inter-panel formations, the formations may be integrally formed to achieve a similar effect.

The invention claimed is:

1. A screening panel suitable for engaging a supporting frame in abutment with a plurality of adjacent screening panels including:

a screening surface, with peripheral sides and screening apertures between the peripheral sides;

each said peripheral side having a plurality of engaging protrusions extending from the peripheral side in a direction transverse to the screening surface for engaging the supporting frame;

the engaging protrusions being shaped and sized to engage complementary formations on the supporting frame in a snap-fit configuration for restricting longitudinal movement along each said peripheral side of the screening panel and movement of the screening panel transverse to the screening surface when engaged; and each said peripheral side having inter-panel formations for engaging adjacent said screening panels which, when engaged to an adjacent screening panel, restrict relative movement between the screening panel and the adjacent screening panel longitudinally along the engaged side and transverse to the screening surface.

2. The screening panel of claim 1 wherein the engaging protrusions define voids between adjacent said engaging protrusions arranged in a regular pattern of said engaging protrusions and voids along each of the peripheral sides.

3. The screening panel of claim 1 wherein the screening panel has a polygonal shape with an even number of the peripheral sides such that each of the peripheral sides has an opposing parallel said peripheral side.

4. The screening panel of claim 3 wherein opposing said peripheral sides have complementary and interlocking inter-panel formations such that the inter-panel formations on one of the peripheral sides of the screening panel engage and interlock with the complementary and interlocking inter-panel formations on an opposing one of the peripheral sides of an adjacent screening panel.

5. The screening panel of claim 4 wherein the inter-panel formations on one said peripheral side are identical to the inter-panel formations on every other of the peripheral sides of the screening panel such that a said screening panel is configured to engage adjacent said screening panels in multiple orientations.

6. The screening panel of claim 4 wherein the inter-panel formations include an arrangement of the engaging protrusions which extend and are staggered transversely from the respective peripheral side with a complementary and inversely staggered arrangement on an opposing respective said peripheral side such that the staggered said protrusions on the respective peripheral side of the screening panel interlock with the complementary and inversely staggered said engaging protrusions on an opposing respective said peripheral side of an adjacent screening panel to secure the screening panel to the adjacent screening panel in a direction longitudinally along and between adjoining respective said peripheral sides.

7. The screening panel of claim 1 wherein the inter-panel formations are formed by the peripheral sides and are curved along the respective peripheral side.

8. The screening panel of claim 1 wherein the inter-panel formations include alternating protrusions and indentations extending transversely from a respective said peripheral side and which engage in a snap-fit configuration.

9. The screening panel of claim 1 wherein the screening panel has one or more integrally formed structural formation in the form of a rib or ribs, with the or each said rib extending from one said peripheral side to an opposing side between the screening apertures.

10. A screening system including: a supporting frame; and a plurality of screening panels according to claim 1; the supporting frame arranged in a pattern corresponding to the peripheral sides of the screening panels such that the supporting frame forms open portions between supporting frame arm sections, and the engaging protrusions on the peripheral sides of the screening panels engage the complementary formations on the supporting frame arm sections of the supporting frame in a snap-fit configuration.

11. The system of claim 10 wherein the system includes a plurality of supporting frame protectors, each said supporting frame protector abutting a said supporting frame arm section of the supporting frame for protecting the supporting frame arm section from material screened by the screening surface of a respective screening panel with said material screened passing through a said open portion of the supporting frame.

12. The system of claim 11 wherein the frame protectors include an angled surface to form a tapered chute in a respective said open portion and ends of the frame protectors are mitred to correspond with and abut opposing ends of adjacent respective said frame protectors.

13. The system of claim 11 wherein two opposing first and second said frame protectors are joined back to back by an intermediate portion, wherein the first frame protector protects one side of a respective said supporting frame arm section and the second frame protector protects an opposing side of the supporting frame arm section and the intermediate portion joins the frame protectors such that the frame protectors straddle the supporting frame arm section.

14. The system of 10 wherein the system includes a side panel attached to an outer periphery of the supporting frame, the side panel including a plurality of spaced side panels engaging protrusions extending from one side of the side panel for engaging complementary formations on the supporting frame in a snap-fit configuration, whereby the side panel extends upwardly from the outer periphery of the supporting frame above at least one said screening panel.

15. The system of claim 14 wherein the side panel includes inter-panel formations for engaging a respective said peripheral side of a said screening panel on the outer periphery of the supporting frame.

16. A screening system of claim 10 wherein each of the screening panels is made of a material relatively more rigid than the supporting frame.

17. A screening system of claim 16 wherein each of the screening panels is made of stainless steel.

18. A screening system of claim 17 where the frame is made of polyurethane or rubber.

* * * * *